(12) United States Patent
Kobayashi et al.

(10) Patent No.: US 12,182,540 B2
(45) Date of Patent: Dec. 31, 2024

(54) INFORMATION PROCESSING DEVICE, RECORDING MEDIUM, AND SUPPORT SYSTEM

(71) Applicant: OMRON Corporation, Kyoto (JP)

(72) Inventors: Yusaku Kobayashi, Kyoto (JP); Daisuke Yagi, Kyoto (JP)

(73) Assignee: OMRON Corporation, Kyoto (JP)

( * ) Notice: Subject to any disclaimer, the term of this patent is extended or adjusted under 35 U.S.C. 154(b) by 216 days.

(21) Appl. No.: 17/626,120

(22) PCT Filed: Feb. 20, 2020

(86) PCT No.: PCT/JP2020/006821
§ 371 (c)(1),
(2) Date: Jan. 10, 2022

(87) PCT Pub. No.: WO2021/024520
PCT Pub. Date: Feb. 11, 2021

(65) Prior Publication Data
US 2022/0291903 A1     Sep. 15, 2022

(30) Foreign Application Priority Data
Aug. 8, 2019   (JP) .................. 2019-146000

(51) Int. Cl.
*G06F 9/44*       (2018.01)
*G05B 19/05*      (2006.01)
(Continued)

(52) U.S. Cl.
CPC ............. *G06F 8/30* (2013.01); *G05B 19/056* (2013.01); *G05B 2219/13004* (2013.01)

(58) Field of Classification Search
CPC ........ G06F 8/30; G06F 11/323; G06F 11/362; G06F 11/3664; G05B 19/056; G05B 2219/13004
See application file for complete search history.

(56) References Cited

U.S. PATENT DOCUMENTS

| | | |
|---|---|---|
| 10,552,125 B1 * | 2/2020 | Gould .................. G06Q 10/103 |
| 2009/0327942 A1 * | 12/2009 | Eldridge .................. G06F 8/34 715/771 |

(Continued)

FOREIGN PATENT DOCUMENTS

| | | |
|---|---|---|
| CN | 1677290 | 10/2005 |
| CN | 101147155 | 3/2008 |

(Continued)

OTHER PUBLICATIONS

Wen Fu, Recovering Variable-argument Functions from Binary Executables, 2008, pp. 545-550. https://ieeexplore.ieee.org/stamp/stamp.jsp?tp=&arnumber=4529875 (Year: 2008).*

(Continued)

*Primary Examiner* — Mongbao Nguyen
(74) *Attorney, Agent, or Firm* — JCIPRNET

(57) ABSTRACT

The present invention provides an information processing device, a recording medium, and a support system. With respect to a second program having a call instruction that designates an actual argument and calls a first program defined by using a dummy argument, the content of the first program defined by using the dummy argument according to a user operation is associated with the call instruction in the second program, and the associated result is displayed. In this case, the actual argument designated in the call instruction to the dummy argument is reflected in the first program, and the reflected result is displayed.

12 Claims, 15 Drawing Sheets

(51) Int. Cl.
    *G06F 8/30*     (2018.01)
    *G06F 9/445*     (2018.01)
    *G06F 9/455*     (2018.01)

(56) References Cited

U.S. PATENT DOCUMENTS

| | | | | |
|---|---|---|---|---|
| 2015/0363702 | A1* | 12/2015 | Baum | G06N 7/01 |
| | | | | 706/52 |
| 2018/0054540 | A1* | 2/2018 | Okuno | G05B 19/042 |
| 2018/0304467 | A1* | 10/2018 | Matsuura | B25J 13/06 |
| 2018/0321916 | A1* | 11/2018 | Inoue | G06F 9/45504 |
| 2018/0365013 | A1* | 12/2018 | Miyoshi | G06F 8/4443 |
| 2019/0163446 | A1* | 5/2019 | Brunel | G06F 8/74 |
| 2019/0188108 | A1* | 6/2019 | Jagannathan | G06F 11/3414 |
| 2020/0379788 | A1* | 12/2020 | Bregman | G06F 8/60 |

FOREIGN PATENT DOCUMENTS

| | | | | |
|---|---|---|---|---|
| CN | 103995500 | | 8/2014 | |
| CN | 105144004 | A * | 12/2015 | G05B 19/056 |
| DE | 112016007089 | T5 * | 5/2019 | F24F 1/22 |
| JP | H08190475 | | 7/1996 | |
| JP | 2008071065 | | 3/2008 | |
| JP | 2008071065 | A * | 3/2008 | |
| JP | 4228602 | B2 * | 2/2009 | |
| JP | 2014071862 | | 4/2014 | |
| JP | 2016224557 | A * | 12/2016 | |
| WO | 2014155717 | | 10/2014 | |
| WO | WO-2017056194 | A1 * | 4/2017 | G05B 19/042 |
| WO | WO-2019099404 | A1 * | 5/2019 | G06F 11/36 |

OTHER PUBLICATIONS

Elena Oat, MoCHA: Augmenting Pervasive Displays through Mobile Devices and Web-based Technologies, 2014, pp. 506-511. https://ieeexplore.ieee.org/stamp/stamp.jsp?tp=&arnumber=6815258 (Year: 2014).*

English translation (WO 2017056194 A1), 2017, pp. 1-189. (Year: 2017).*

English translation, Noguchi et al. (CN 105144004 A), 2015, pp. 1-21. (Year: 2015).*

English translation, JP (JP 4228602 B2), 2009, pp. 1-12. (Year: 2009).*

Kazumasa Fukuda, An Obfuscation Method to Build a Fake Call Flow Graph by Hooking Method Calls, 2014, pp. 1-6. https://ieeexplore.ieee.org/stamp/stamp.jsp?tp=&arnumber=6888726 (Year: 2014).*

Bruce Johnson, "Professional Visual Studio 2017", Wrox, Nov. 2017, pp. 1-888.

"Search Report of Europe Counterpart Application", issued on Jul. 24, 2023, p. 1-p. 9.

"International Search Report (Form PCT/ISA/210) of PCT/JP2020/006821," mailed on Apr. 21, 2020, with English translation thereof, pp. 1-4.

"Written Opinion of the International Searching Authority (Form PCT/ISA/237) of PCT/JP2020/006821," mailed on Apr. 21, 2020, with English translation thereof, pp. 1-6.

Office Action of China Counterpart Application, with English translation thereof, issued on Mar. 5, 2024, pp. 1-19.

\* cited by examiner

INFORMATION PROCESSING DEVICE, RECORDING MEDIUM, AND SUPPORT SYSTEM

CROSS-REFERENCE TO RELATED APPLICATION

This application is a 371 application of the International PCT application serial no. PCT/JP2020/006821, filed on Feb. 20, 2020, which claims the priority benefits of Japan Patent Application No. 2019-146000, filed on Aug. 8, 2019. The entirety of each of the above-mentioned patent applications is hereby incorporated by reference herein and made a part of this specification.

TECHNICAL FIELD

The present invention relates to an information processing device that supports the development of a user program that is executed by a control device that controls a control target, a recording medium that supports the development of a user program, and a support system including the information processing device.

BACKGROUND ART

At various manufacturing sites, control devices such as a programmable logic controller (PLC) have been introduced. Such a control device is a type of computer, and executes a user program designed according to a manufacturing device, a manufacturing facility, or the like. Such a user program is created in a development environment prepared separately from the control device.

In the user program, one or a plurality of programs defining arithmetic processing that is frequently used is prepared and a call instruction for calling the programs is described in the user program, so that a program can be made into parts and reused. Making the program into parts and reusing the program facilitate creation of the user program, but a hierarchical program makes it difficult to analyze the created user program.

Japanese Patent Laid-Open No. 2014-071862 (Patent Literature 1) discloses a peripheral device of a programmable controller including a sequence program display processing unit that displays a subprogram call instruction, and expands a display of a subprogram between the subprogram call instruction and a next step using a subprogram display expansion processing unit.

CITATION LIST

Patent Literature

Patent Literature 1: Japanese Patent Laid-Open No. 2014-071862

SUMMARY OF INVENTION

Technical Problem

A user can check a program called by a call instruction by the program called by the call instruction being displayed as disclosed in Patent Literature 1. However, since it is possible to designate an arbitrary actual argument for each call instruction that is a call source and call a program, the user must replace a dummy argument with an actual argument designated at the time of calling and check a program when the program is displayed as defined by the dummy argument. Therefore, it is difficult to perform analysis of the user program using a program made into parts and reused by using a call instruction.

Solution to Problem

According to an example of the present disclosure, an information processing device for supporting development of a user program executed by a control device for controlling a control target is provided. The information processing device includes a reception means configured to receive a user operation; a holding means configured to hold a user program created or updated by a user; and a display means configured to display the user program held in the holding means. The user program includes a first program defined by using a dummy argument, and a second program including a call instruction for designating an actual argument and calling the first program. When the display means displays content of the first program in association with the call instruction in the second program according to a user operation, the display means reflects the actual argument designated in the call instruction in the dummy argument in the first program to display the content.

According to this disclosure, it is possible to visually display an argument in the second program concretely used to execute the first program, and as a result, the analysis of the second program is facilitated.

In the above-described disclosure, the user program may be defined by using a procedural programming language including one or a plurality of instructions. The display means may replace the dummy argument in the first program with an actual argument designated in the call instruction as a reflection of the actual argument designated in the call instruction.

According to this configuration, the dummy argument is replaced with the actual argument, so that a user can analyze the second program without being aware of the dummy argument.

In the above-described disclosure, the display means may display the content of the first program as a part of the second program immediately after the call instruction in the second program.

According to this configuration, it is possible to display a flow of the second program in an easy-to-understand manner, and as a result, the analysis of the user program is facilitated.

In the above-described disclosure, the display means may display the content of the first program in a line different from a line in which the second program is displayed, in line with the call instruction in the second program.

According to this configuration, it is possible to indicate a hierarchical structure of a call in an easy-to-understand manner, and as a result, the analysis of the user program is facilitated.

In the above-described disclosure, the first program may include a call instruction for recursively calling the first program. When the display means displays the content of the first program in association with the call instruction in the second program, the display means may display the content of the first program called by the call instruction in the first program a predetermined number of times.

According to this configuration, it is possible to prevent the content of the user program from being difficult to ascertain due to repeated display of the content of the first program, and as a result, to display the content in an easy-to-ascertain aspect.

In the above-described disclosure, the first program may include one or a plurality of types of call instructions. The display means may not set a predetermined specific instruction among the one or plurality of types of call instructions as a target for which content of a program called by the call instruction is displayed in association with the call instruction.

According to this configuration, since it is possible to omit content of a predetermined specific instruction, it is possible to display only content of a necessary program, and as a result, the analysis of the user program is facilitated.

In the above-described disclosure, the first program and the second program may be defined using a block representation including at least one input variable and at least one output variable indicating a functional block or a function. The display means may incorporate a first block representation indicating the first program into a second block representation indicating the call instruction included in the second program as a reflection of the actual argument designated in the call instruction, and perform the display in an aspect in which a terminal corresponding to the actual argument of the second block representation and a terminal corresponding to the dummy argument of the first block representation are coupled.

According to this configuration, it is possible to display a relationship between the first program and the second program in a visually easy-to-understand manner for the first program and the second program defined by using a block representation, and as a result, the analysis of the user program is facilitated.

In the above-described disclosure, the user program may include a branch program for executing different processes depending on a satisfaction condition. The display means may display content of the different processes in parallel according to a user operation for the branch program.

According to this configuration, it is possible to make it easy to understand how the process branches, and as a result, the analysis of the user program is facilitated.

In the above-described disclosure, the control device may include one or a plurality of input ports. The display means may replace the actual argument with an address of each of the one or a plurality of input ports and perform the display for the content of the user program on the basis of a variable map in which the actual argument is associated with the address.

According to this configuration, it is possible to show at a glance an address at which an input value is used by the user program, and as a result, the analysis of the program is facilitated.

In the above-described disclosure, the user program may include a third program for executing data exchange with another program. The display means may display the third program in association with the other program.

According to this configuration, even when the programs differ, the programs are displayed in association with each other in a case in which data is exchanged between the programs, so that it is possible to show a correspondence relationship between the programs, and as a result, analysis of the program is facilitated.

According to another example of the present disclosure, a recording medium, recording a support program for supporting development of a user program executed by a control device for controlling a control target is provided. The user program includes a first program defined by using a dummy argument, and a second program including a call instruction for designating an actual argument and calling the first program. The support program causes a computer to execute a step of holding a user program created or updated by a user, a step of receiving a user operation, and a step of displaying content of the first program in association with the call instruction in the second program for the held user program according to a received operation, and reflecting the actual argument designated in the call instruction in the dummy argument in the first program to display the content.

According to this disclosure, an argument in the second program concretely used to execute the first program is displayed so that the analysis of the second program is facilitated.

According to still another example of the present disclosure, a support system including an information processing device for supporting development of a user program executed by a control device for controlling a control target, and a display device is provided. The support system includes a reception means configured to receive a user operation; a holding means configured to hold a user program created or updated by a user; and a display means configured to display the user program held in the holding means. The user program includes a first program defined by using a dummy argument, and a second program including a call instruction for designating an actual argument and calling the first program. When the display means displays content of the first program in association with the call instruction in the second program according to a user operation, the display means reflects the actual argument designated in the call instruction in the dummy argument in the first program to display the content.

According to this disclosure, analysis of the second program is facilitated by displaying an argument in the second program concretely used to execute the first program.

Effects of Invention

According to the present invention, the analysis of the user program including the call instruction is facilitated.

DESCRIPTION OF EMBODIMENTS

Hereinafter, embodiments according to the present invention will be described with reference to the drawings. In the following description, the same parts and components are denoted by the same reference signs. Names and functions thereof are the same. Therefore, detailed description of these will not be repeated. The embodiments and modification examples to be described below may be appropriately selectively combined.

§ 1. Application Example

Figure 1:
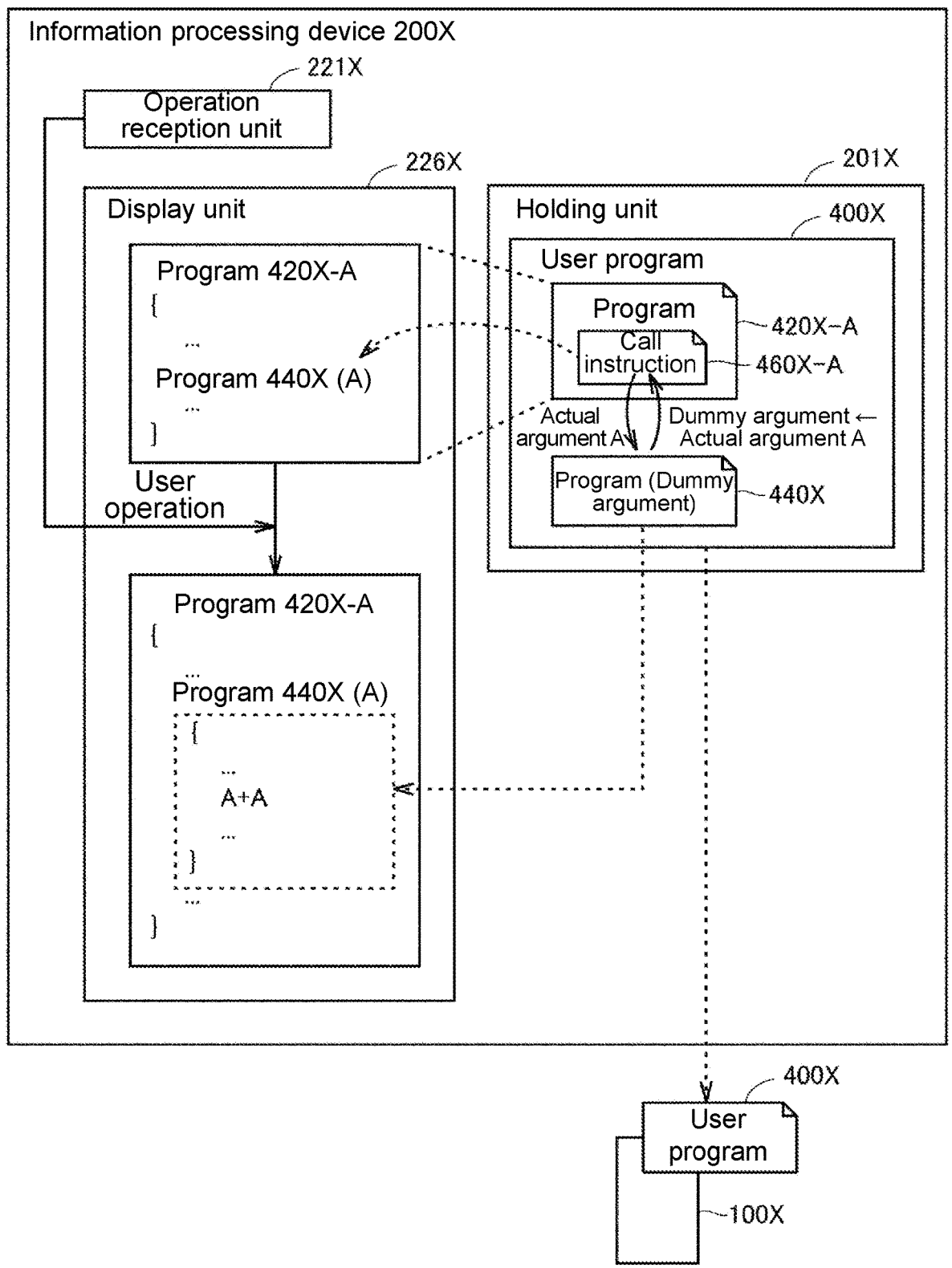
FIG. 1 is a diagram schematically illustrating a scene in which an information processing device 200X according to the present embodiment is applied.

An example of a situation in which the present invention is applied will be described with reference to FIG. 1. FIG. 1 is a diagram schematically illustrating a scene in which an information processing device 200X according to the present embodiment is applied.

The information processing device 200X is a device for supporting the development of a user program 400X. The information processing device 200X has, for example, a function for supporting the development of the user program 400X, such as an editor function for editing or updating the user program 400X. The editing function may include an online editing function and an offline editing function.

Further, even when the information processing device 200X does not have an editor function, the information processing device 200X may have only a function of supporting the development of the user program 400X, such as a function of displaying the user program 400X that is executed in a PLC 100X.

Referring to FIG. 1, the information processing device 200X includes a holding unit 201X, an operation reception unit 221X, and a display unit 226X. The information processing device 200X is typically realized by a personal computer.

The holding unit 201X holds the user program 400X created or edited by the user. The holding unit 201X is a function that is typically realized by a hard disk that non-volatilely stores various programs that are executed in the information processing device 200X.

The user program 400X is executed in the PLC 100X, which is an example of a control device for controlling a control target. The user program 400X is configured by combining a plurality of programs, and includes a main program 420X having a call instruction 460X and a subprogram 440X that is called by the call instruction 460X. The subprogram 440X is defined by using a dummy argument, the dummy argument is replaced with an actual argument designated by the call instruction 460X, and when the subprogram 440X is executed.

In the example illustrated in FIG. 1, the user program 400X includes a main program 420X-A and a subprogram 440X. A call instruction 460X-A included in the main program 420X-A is an instruction for designating "A" as an actual argument to call and execute the subprogram 440X.

The user program 400X may have a structure in which the subprogram 440X further has the call instruction 460X and a called subprogram calls another subprogram.

The operation reception unit 221X receives a user operation. For example, the operation reception unit 221X is an input interface that receives an input signal from a mouse or a keyboard.

The display unit 226X visually displays the user program 400X on a display or the like. Referring to FIG. 1, the display unit 226X displays content of the subprogram 440X called by the call instruction 460X in association with the call instruction 460X included in the main program 420X-A according to the user operation received by the operation reception unit 221X.

In this case, the display unit 226X reflects the actual argument designated in the call instruction 460X in the dummy argument of the subprogram 440X and performs a display. In the example illustrated in FIG. 1, "A+A" is displayed.

A function of displaying the content of the subprogram 440X is used, for example, during debugging work after the user program 400X is created. Further, the function of displaying the content of the subprogram 440X can be used, for example, when a problem occurs while the user program 400X is installed and executed in the PLC 100X.

The user program 400X is described in a format of the call instruction 460X while the user program 400X is being created, and there is convenience in that the subprogram 440X can be used without awareness of the content of the subprogram 440X.

However, when there is a problem with the user program 400X, when the user program 400X is being tested, or when the user program 400X is being created, a situation in which the content of the subprogram 440X is to be checked occurs. In such a case, when the subprogram 440X is displayed as defined by a dummy argument, the user needs to check the content of the subprogram 440X while remembering the actual argument designated when the subprogram 440X is called.

In particular, when a structure of the user program 400X is complicated, such as when the subprogram 440X further includes the call instruction 460X, displaying a dummy argument as it is makes analysis of the user program 400X more difficult.

Since the display unit 226X reflects the actual argument in the dummy argument and displays the content of the subprogram 440X, it is possible to facilitate the analysis of the user program 400X.

§ 2. Concrete Example

<A. System Configuration>

Figure 2:
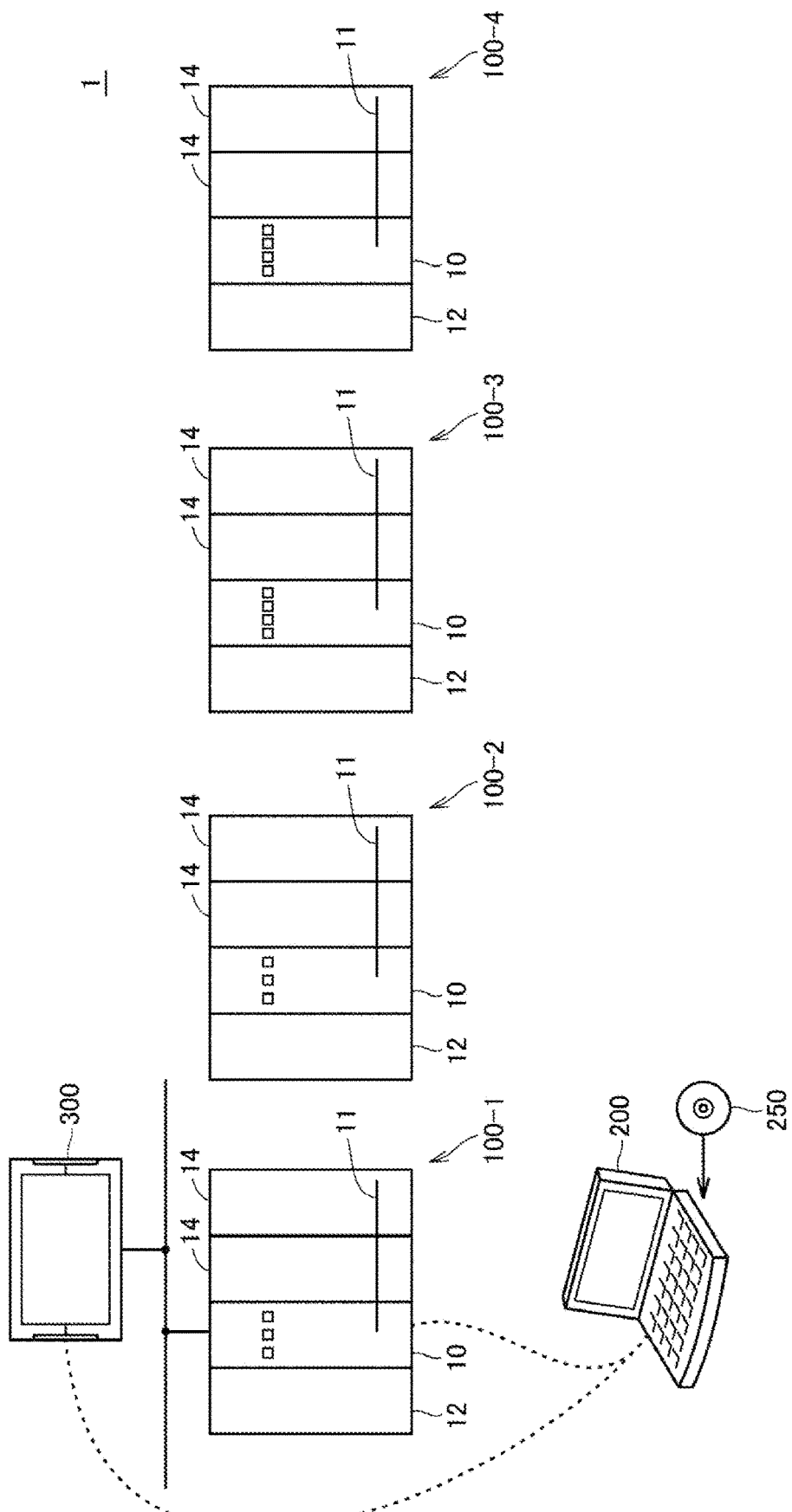
FIG. 2 is a schematic diagram illustrating a configuration example of a control system 1.

A control system 1 including a support device 200 according to the present embodiment will be described with reference to FIG. 2. FIG. 2 is a schematic diagram illustrating a configuration example of the control system 1.

Referring to FIG. 2, the control system 1 includes a plurality of PLCs including a PLC 100-1, a PLC 100-2, a PLC 100-3, a PLC 100-4 . . . (hereinafter also collectively referred to as a "PLC 100"), a human machine interface (HMI) 300, and a support device 200.

Each PLC 100 is an example of a control device that controls a control target that is a field device such as a relay or a sensor. The control system 1 may include one PLC 100. Hereinafter, a development environment and an execution environment in which the control system 1 has one PLC 100 as a target will be described for simplicity of description.

The PLC 100 typically includes a central processing unit (CPU) unit 10 that is a subject that executes various programs including a user program, a power supply unit 12 that supplies power to a CPU unit 10 and the like, and an input/output (I/O) unit 14 that exchanges signals from a field. The I/O unit 14 is connected to the CPU unit 10 via a system bus 11. The PLC 100 can be connected to the support device 200.

The HMI 300 is an example of an information processing device that provides a development environment for a user program. The HMI 300 is also an example of a display device capable of visually displaying a user program that is being executed in the PLC 100. The HMI 300 may further include a function of presenting various types of information obtained by a control calculation in the PLC 100 to an operator and generating an internal instruction or the like for the PLC 100 according to an operation from the operator. For a communication protocol between the HMI 300 and the PLC 100, typically, EtherNet/IP (registered trademark) is used. Further, the HMI 300 can be connected to the support device 200.

The support device 200 is an example of an information processing device that provides a development environment for the user program that is executed by the PLC 100. Further, the support device 200 generates various types of information for displaying the user program on the HMI 300. Such a development environment is provided by a support program being installed on the support device 200.

The support program is, for example, "Sysmac Studio" manufactured by OMRON Corporation. A user (designer) can design the user program for the PLC 100 by using the support program, and install the designed user program on the PLC 100.

The support program is stored in a recording medium 250 and distributed, and then is installed in the support device 200, for example. The support program may be installed from an external server device or the like via a network, instead of the recording medium 250. The support device 200, for example, is connected to the CPU unit 10 of the PLC 100 or the HMI 300 via a connection cable. The support device 200 is typically realized by a personal computer.

A development support environment that is provided by the support device 200 may have, for example, a program editor (editing), a debug, a simulator, and a monitor function for outputting output information thereof to a monitor such as a display. The support device 200 may further have a function of acquiring a state value of the PLC 100 in operation and outputting the state value to a monitor such as a display.

The user program that is a development target may include, for example, a program conforming to the international standard IEC 61131-3. In the international standard IEC 61131-3, five types including a ladder diagram (LD), a functional block diagram (FBD), a sequential function chart (SFC), an instruction list (IL), and a structured text (ST) are defined as programming languages for a PLC application including a user program. The user program according to the present embodiment may be described in any programming language according to the international standard IEC 61131-3, and may be described in a language unique to a manufacturer or a procedural programming language such as C language.

The support device 200 and the HMI 300 can display the content of the user program. Specifically, the support device 200 and the HMI 300 can display a source code of the user program. The support device 200 displays, for example, the content of the user program during editing or updating work for the user program. Further, the HMI 300 receives, for example, an operation of the user and displays the content of the user program on the basis of the operation. For example, the user performs an operation for displaying the content of the user program with respect to the HMI 300, for example, when a problem occurs in the control system 1.

Although not illustrated in FIG. 2, the HMI 300 can execute a display program for visually displaying the content of the user program.

<B. Hardware Configuration of PLC 100>

Figure 3:
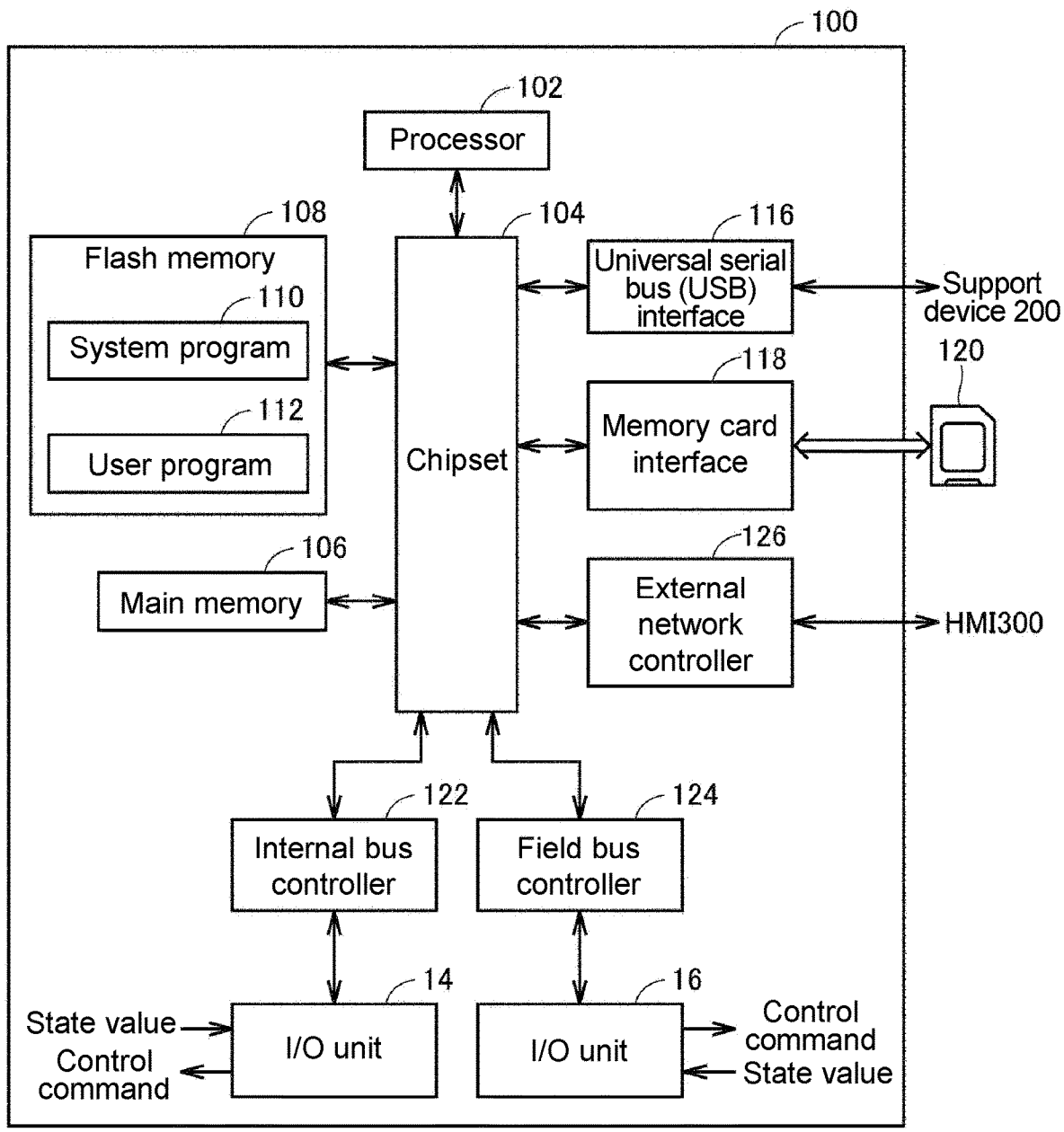
FIG. 3 is a schematic diagram illustrating a hardware configuration example of a PLC 100.

FIG. 3 is a schematic diagram illustrating a hardware configuration example of the PLC 100. Referring to FIG. 3, the PLC 100 realizes control for a control target by a processor executing a pre-installed program. More specifically, the PLC 100 includes a processor 102 such as a CPU or micro-processing unit (MPU), a chipset 104, a main memory 106, a flash memory 108, a universal serial bus (USB) interface 116, a memory card interface 118, an internal bus controller 122, a fieldbus controller 124, and an external network controller 126. The flash memory 108 stores a system program 110 and a user program 112.

The processor 102 reads the system program 110 and the user program 112 stored in the flash memory 108, expands the system program 110 and the user program 112 in the main memory 106, and executes the system program 110 and the user program 112, thereby realizing control for the control target.

The system program 110 includes an instruction code for providing basic functions of the PLC 100, such as data input and output processing and execution timing control. The user program 112 is created according to a control purpose (for example, a target line or process) in the user.

The user program 112 is, for example, a sequence program for executing sequence control and a motion program for executing motion control. The user program 112 is not limited to these programs, and may be a program that can be installed in the PLC 100, which is a program that is created or edited by the user. For example, the user program 112 includes a program that has become a common component 142 stored in a library 140, which will be described below. The user may include a user who directly uses the PLC 100, and a user who develops software in response to a request from the user who directly uses the PLC 100.

The chipset 104 realizes processing of the PLC 100 as a whole by controlling each component.

The internal bus controller 122 is an interface for exchanging data between the PLC 100 and the I/O unit 14 connected through an internal bus. The fieldbus controller 124 is an interface that exchanges data between the PLC 100 and an I/O unit 16 connected through a fieldbus (not illustrated). The internal bus controller 122 and the fieldbus controller 124 acquire state values input to the corresponding I/O units 14 and 16, respectively, and outputs the state values from the corresponding I/O units 14 and 16 using a calculation result of the processor 102 as a command value, respectively.

The USB interface 116 controls the exchange of data using a USB. The support device 200 communicates with the PLC 100 via the USB interface 116. The memory card interface 118 is configured so that a memory card 120 can be attached thereto or detached therefrom, and can write data to the memory card 120 and read data from the memory card 120.

The external network controller 126 controls exchange of data through various wired/wireless networks. The PLC 100 exchanges data with the HMI 300, a gateway, a database server, a distribution server, or another PLC 100 via the external network controller 126.

The user program 112 created or edited by the user can be installed from the support device 200, the memory card 120, the distribution server, or the like.

In FIG. 3, a configuration example in which necessary functions are provided by the processor 102 executing a program has been shown, and some or all of these provided functions may be implemented by using a dedicated hardware circuit (for example, an application specific integrated Circuit (ASIC) or a field-programmable gate array (FPGA)). Alternatively, main parts of the PLC 100 may be realized by using hardware that follows a general-purpose architecture (for example, an industrial personal computer based on a general-purpose personal computer). In this case, a virtualization technique may be used to execute a plurality of operating systems (OSs) having different uses in parallel and to execute necessary applications on each OS.

<C. Hardware Configuration of Support Device 200>

Figure 4:
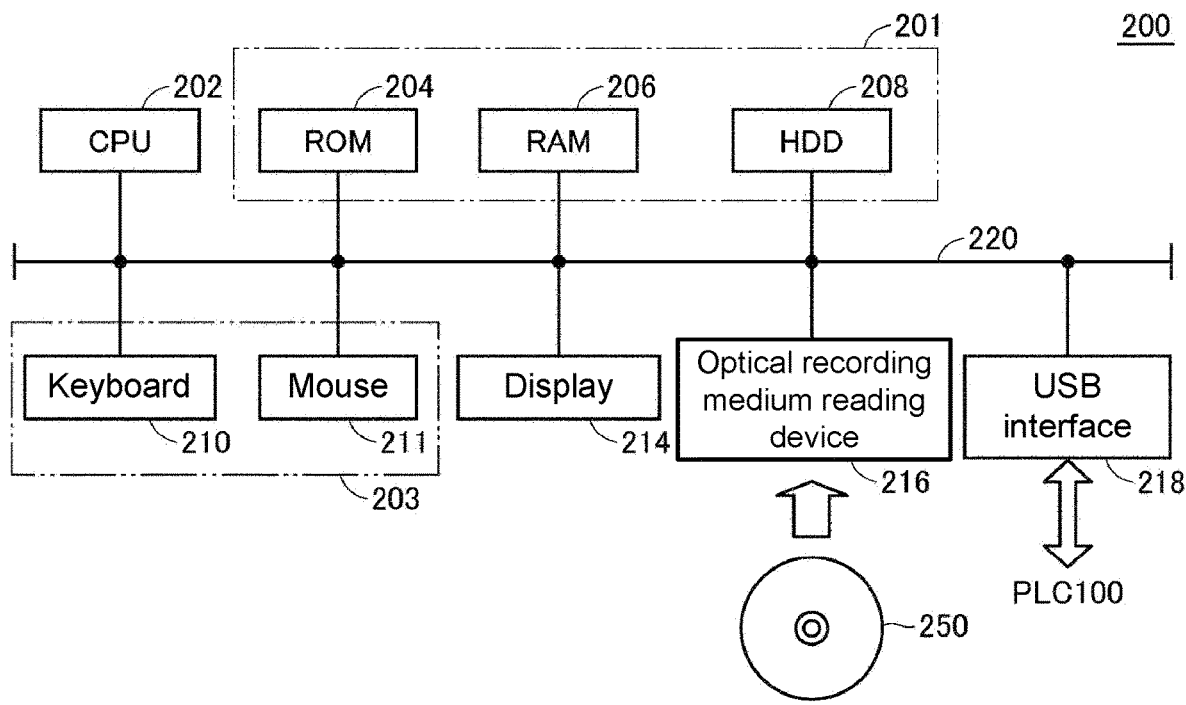
FIG. 4 is a schematic diagram illustrating a hardware configuration example of a support device 200.

FIG. 4 is a schematic diagram illustrating a hardware configuration example of the support device 200. Referring to 4, the support device 200 typically includes a general purpose computer. From the viewpoint of maintainability at a manufacturing site in which the PLC 100 is disposed, a laptop-type personal computer having excellent portability is preferable.

The support device 200 includes a storage unit 201 and a CPU 202 that executes various programs including an OS. The storage unit 201 includes a read only memory (ROM) 204 that stores BIOS or various pieces of data, a random access memory (RAM) 206 that provides a work area for storing data necessary for execution of a program in the CPU 202, and a hard disk (HDD) 208 that non-volatilely stores programs or the like to be executed by the CPU 202. These components are connected via a bus 220.

The support device 200 further includes an operation unit 203 including a keyboard 210 and a mouse 211 that the user operates to input instructions to the support device 200, and a display 214 for presenting information to the user.

The support device 200 includes an optical recording medium reading device 216 for reading a support program for providing a development support environment stored in the recording medium 250 from the recording medium 250. The support program may be installed from a memory card, a distribution server, or the like.

A USB interface 218 controls the exchange of data using a USB. The support device 200 communicates with the PLC 100 or the HMI 300 via the USB interface 218. The communication between the support device 200 and the PLC 100, and the communication between the support device 200 and the HMI 300 are not limited to the USB and may be Ethernet (registered trademark) or the like.

Although a configuration example in which necessary functions are provided by a processor such as the CPU 202 executing a program has been illustrated in FIG. 4, some or all of these provided functions may be implemented by using a dedicated hardware circuit (for example, an ASIC or an FPGA). In this case, a virtualization technology may be used to execute a plurality of OSs having different uses in parallel and to execute necessary applications on each OS.

<D. Hardware Configuration of HMI 300>

Figure 5:
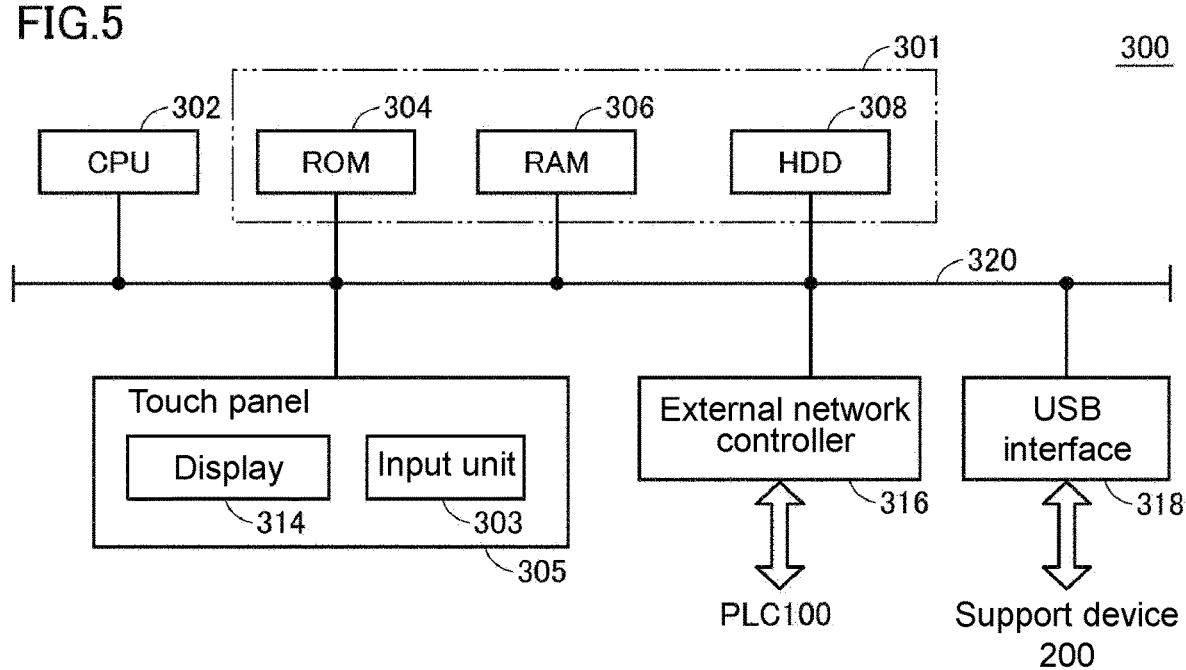
FIG. 5 is a schematic diagram illustrating a hardware configuration example of an HMI 300.

FIG. 5 is a schematic diagram illustrating a hardware configuration example of the HMI 300. Referring to 5, the HMI 300 typically includes a general-purpose computer. The HMI 300 may be, for example, a stationary type, may be provided in the form of a laptop-type personal computer having excellent portability at the manufacturing site in which the PLC 100 is disposed, or may be provided in the form of a tablet-type terminal. The HMI 300 may include dedicated hardware, instead of a general-purpose computer.

The HMI 300 includes a storage unit 301, and a CPU 302 that executes various programs including an OS. The storage unit 301 includes a ROM 304 that stores BIOS or various pieces of data, a memory RAM 306 that provides a work area for storing data necessary for execution of a program in the CPU 302, and an HDD 308 that stores, for example, a program executed in the CPU 302 in a non-volatile manner. These components are connected via a bus 320.

The HMI 300 further includes a touch panel 305, an external network controller 316, and a USB interface 318.

The touch panel 305 includes a display 314 and an input unit 303 that receives user operations. The display 314 and the input unit 303 may be configured separately. In this case, the input unit 303 may include a mouse and a keyboard. Further, a mouse and a keyboard may be included, in addition to the input unit 303 provided as a part of the touch panel 305.

The external network controller 316 controls the exchange of the data with the PLC 100.

The USB interface 318 controls exchange of data using a USB. The HMI 300 communicates with the support device 200 via the USB interface 318.

Although a configuration example in which necessary functions are provided by a processor such as the CPU 302 executing a program has been illustrated in FIG. 5, some or all of these provided functions may be implemented by using a dedicated hardware circuit (for example, an ASIC or an FPGA). In this case, a virtualization technology may be used to execute a plurality of OSs having different uses in parallel and to execute necessary applications on each OS.

<E. Software Configuration Example of PLC 100>

Figure 6:
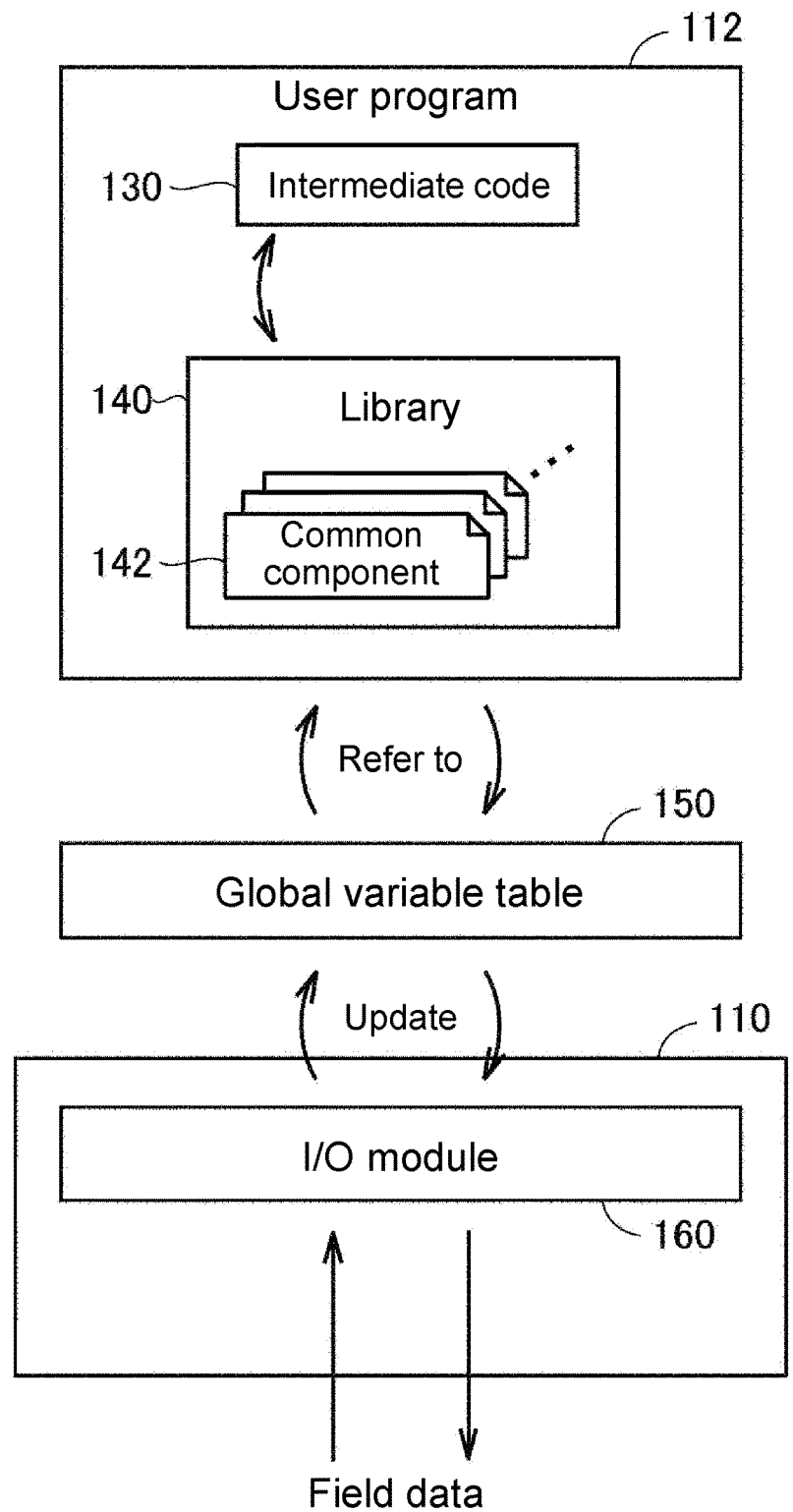
FIG. 6 is a schematic diagram illustrating a software configuration example of the PLC 100.

Next, an example of a software configuration of the PLC 100 will be described. FIG. 6 is a schematic diagram illustrating an example of the software configuration of the PLC 100. Referring to FIG. 6, in the PLC 100, the system program 110 and the user program 112 are executed as control programs. The system program 110 includes an I/O module 160 as a part of its function, and associates data (data acquired from a field and data output to the field) that the I/O units 14 and 16 exchanges with the field side, with a global variable table 150.

Variable programming is possible in the PLC 100, and the user program 112 executes various processing by using variables associated with field data defined in the global variable table 150. The variable is defined as an actual argument of the user program 112. Further, a variable defined as an actual argument is not limited to the variable defined in the global variable table 150 (global variable), and may be an internally referenced local variable.

The global variable table 150 associates a variable available in the user program 112 with a port number (address) of an actual functional unit (for example, the I/O units 14 and 16), and defines assignment of arbitrary variable name to a value collected at a certain port of a certain functional unit. Further, the global variable table 150 defines assignment of arbitrary variable name to a value output from a certain port of a certain functional unit.

The user program 112 included in the PLC 100 is a native code in a format that can be executed by the processor 102. The user program 112 includes an intermediate code 130 and the library 140. The common component 142 for making description of the user program 112 efficient is stored in the library 140. The intermediate code 130 is obtained by a build process being performed on a user program described in a high-level language. The native code (the user program 112) may be generated by the processor 102, or may be generated under a development environment (for example, the support device 200) prepared separately from the PLC 100. The processor 102 generates the user program 112 from the intermediate code 130 while referring to each common component 142 stored in the library 140. In the example illustrated in FIG. 6, for convenience, the user program 112 includes the intermediate code 130 and the library 140, and the processor 102 generates the user program 112 while referring to each common component 142 stored in the library 140 from the intermediate code 130. A part or all of the library 140 may be converted into the intermediate code 130 or the native code.

<F. Software Configuration of Support Device 200>

Figure 7:
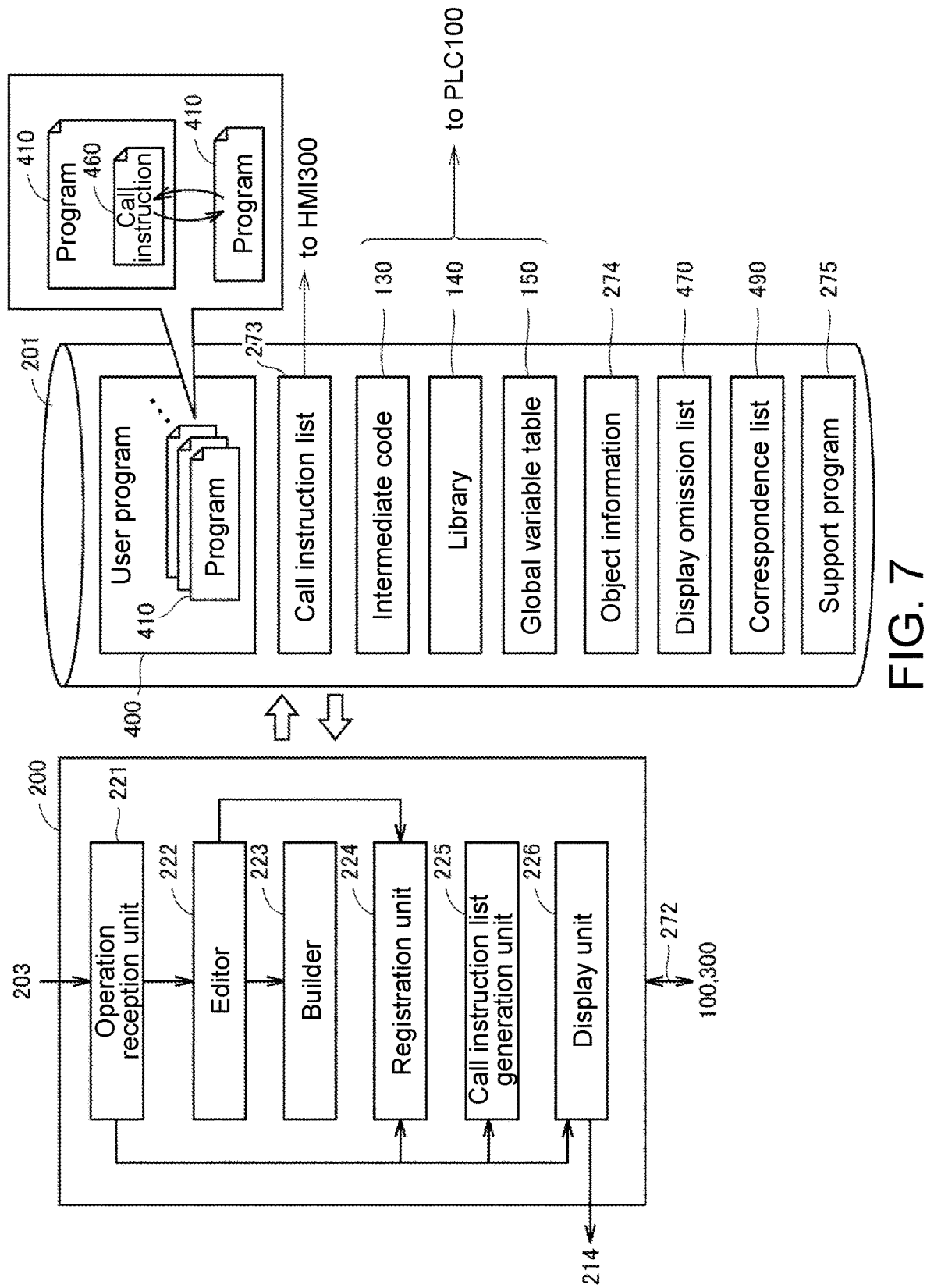
FIG. 7 is a schematic diagram illustrating a software configuration example of the support device 200.

FIG. 7 is a schematic diagram illustrating a software configuration example of the support device 200. In FIG. 7, an example of information stored in the storage unit 201 in association with a software configuration of the support device 200 is illustrated.

(F1. Information Stored in Support Device 200)

The information stored in the storage unit 201 includes a user program 400 that is a program source code, the intermediate code 130, the library 140, the global variable table 150, a call instruction list 273, object information 274, a display omission list 470, a correspondence list 490, and a support program 275.

The user program 400 includes a plurality of programs 410. The program 410 includes a program having a call instruction 460 for calling another program. A program called by the call instruction 460 may further have a call instruction.

A program design for calling the other program 410 using the call instruction 460 is performed arbitrarily by the user. Further, when the call instruction 460 is incorporated into the program 410, the user performs design so that an actual argument is designated, and a program that is a calling destination is called.

The intermediate code 130 and the library 140 are generated by a builder 223 performing the build process on the user program 400. The intermediate code 130 and the library 140 are installed in the PLC 100 as the user program 112.

The object information 274 is used to display content of the user program 400 on the display 214. Specifically, the object information 274 includes each component for visually indicating the content of the user program 400.

The call instruction list 273 is a list that is created on the basis of the created user program 400. Details of the call instruction list 273 will be described below with reference to FIG. 8.

The call instruction list 273 is sent to the HMI 300. Further, although not illustrated in FIG. 7, the support device 200 generates a program 510 as image information obtained by visualizing the content of the program 410 for each program 410 on the basis of the user program 400 and the object information 274, and sends the program 510 as a user program 500 to the HMI 300. The HMI 300 displays the content of the user program 400 on the display 314 on the basis of the user program 500 sent and the call instruction list 273.

The display omission list 470 is information indicating the program 410 that is omitted without content thereof being displayed among the programs 410. Details of the display omission list 470 will be described below.

The correspondence list 490 is information for defining a relationship between the programs 410 that are executed separately. Details of the correspondence list 490 will be described below.

(f2. Module for Providing Development Support Environment)

Referring to 7, the support program 275 is stored in the storage unit 201. Various functions illustrated in FIG. 7 are realized by the CPU 202 executing the support program 275. Specifically, the support program 275 provides functions of an operation reception unit 221, an editor 222, the builder 223, a registration unit 224, a call instruction list generation unit 225, and a display unit 226.

The operation reception unit 221 receives an operation input from the operation unit 203. The operation reception unit 221 is typically an input interface.

The editor 222 edits and creates the user program 400 according to the user operation. The editor 222 may further provide an online editing function of rewriting (editing) a part of a control program that is executed while the PLC 100 is in operation.

The builder 223 performs the build process (including parsing, optimization, compilation, or the like) on the user program 400 to generate the user program 112 in a format that can be executed by the PLC 100.

The registration unit 224 generates the correspondence list 490 for defining the relationship between the programs 410 on the basis of the user program 400 created by the editor 222. Further, the registration unit 224 may generate the display omission list 470 on the basis of the user operation received by the operation reception unit 221.

The call instruction list generation unit 225 creates the call instruction list 273 from the user program 400 according to the user operation received by the operation reception unit 221.

The display unit 226 displays the content of the user program 400 on the display 214. Further, the display unit 226 displays the content of the program 410 called by the call instruction 460 according to the user operation received by the operation reception unit 221. A display method will be described below with reference to FIGS. 9 to 11. The user operation includes, for example, a specific operation with respect to an object indicating the call instruction 460 or an operation with respect to a display menu.

Further, the display unit 226 can change an aspect in which content of a specific instruction designated in advance is displayed when a user operation with respect to the instruction is performed, which will be described below with reference to FIGS. 12 to 16.

<G. Software Configuration Example of HMI 300>

Figure 8:
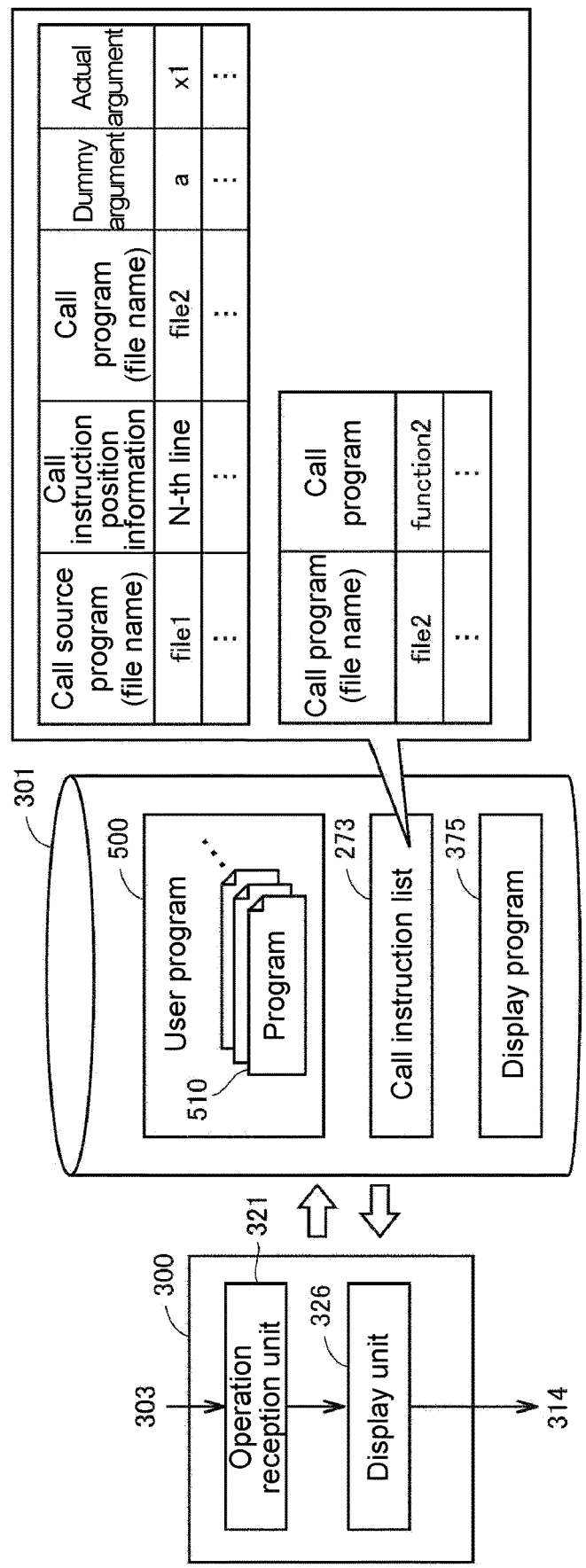
FIG. 8 is a schematic diagram illustrating a software configuration example of the HMI 300.

FIG. 8 is a schematic diagram illustrating a software configuration example of the HMI 300. In FIG. 8, an example of information stored in the storage unit 301 is illustrated in association with a software configuration of the HMI 300.

The information stored in the storage unit 301 includes the user program 500, the call instruction list 273, and a display program 375.

The user program 500 and the call instruction list 273 are information sent from the support device 200. The user program 500 includes a plurality of programs 510. Each program 510 is stored in the storage unit 301 as image information (including text information) visualized in order to display the content of the program on the display 314. The user program 500 is generated by the support device 200 on the basis of the user program 400 stored in the support device 200, for example. Further, the user program 500 may be generated by the HMI 300 when the HMI 300 has installed the user program 400 from the support device 200.

The call instruction list 273 includes information indicating a file name in which a program that is a call source having the call instruction 460 is stored, a position in which the call instruction 460 appears (call instruction position information), a file in which a program to be called by the call instruction 460 is stored, a dummy argument used to define the program called by the call instruction 460, and an actual argument designated by the call instruction 460. Further, the call instruction list 273 includes information indicating a file name to be called and a program stored in the file.

The display program 375 is a program for displaying the user program 500 on the display 314. Various functions illustrated in FIG. 8 are realized by the CPU 302 executing the display program 375. Specifically, the display program 375 provides functions of an operation reception unit 321 and a display unit 326.

The display unit 326 displays each program 510 included in the user program 500 on the display 314. Further, the display unit 326 specifies the program 510 called by the call instruction 460 according to the user operation received by the operation reception unit 321 on the basis of the call instruction list 273, and displays the program 510. The user operation includes, for example, a specific operation with respect to an object indicating the call instruction 460 or an operation with respect to a display menu.

<H. Reflection Display of Actual Argument>

In the present embodiment, the support device 200 can display the content of the program called by the call instruction 460 according to the user operation in association with the call instruction 460 of the program that is a call source. In FIGS. 9 to 16 below, description will be given in an example in which the support device 200 displays the content of the program 410.

Hereinafter, the program called by the call instruction 460 is also referred to as the subprogram 440, and the program having the call instruction 460 is also referred to as a main program 420. It is also possible for the subprogram 440 to have the call instruction 460, and in this case, the subprogram 440 becomes a main program from the viewpoint of a program called by the call instruction 460 of the subprogram 440. That is, the subprogram 440 and the main program 420 are defined in a relative relationship.

When the CPU 202 of the support device 200 displays the content of the subprogram 440 in association with the call instruction 460 of the main program 420 according to a user operation, the CPU 202 reflects an actual argument 480 designated in the call instruction 460 in a dummy argument 442 in the subprogram 440 and displays the content (source code) of the subprogram 440 on the display 214.

Thus, the actual argument 480 designated in the call instruction 460 is reflected in the dummy argument 442 in the subprogram 440, and the content of the subprogram 440 is displayed, so that the analysis of the main program 420 is facilitated. Specifically, when the content of the subprogram 440 is displayed with the dummy argument 442 as it is, the user must perform analysis while remembering the actual argument 480 designated at the time of calling the subprogram 440. When the content of the subprogram 440 is displayed with the dummy argument 442 as it is, especially when the subprogram 440 is described in a configuration in which the call instruction 460 for calling another subprogram 440 is included, a call hierarchy becomes deep and analysis becomes more difficult.

By reflecting the actual argument 480 designated in the call instruction 460 in the dummy argument 442 in the subprogram 440 and displaying the content of the subprogram 440, an actual argument used when the subprogram 440 called by the call instruction 460 is executed is concretely displayed, and as a result, the analysis of the user program including the main program 420 is facilitated.

Figure 9:
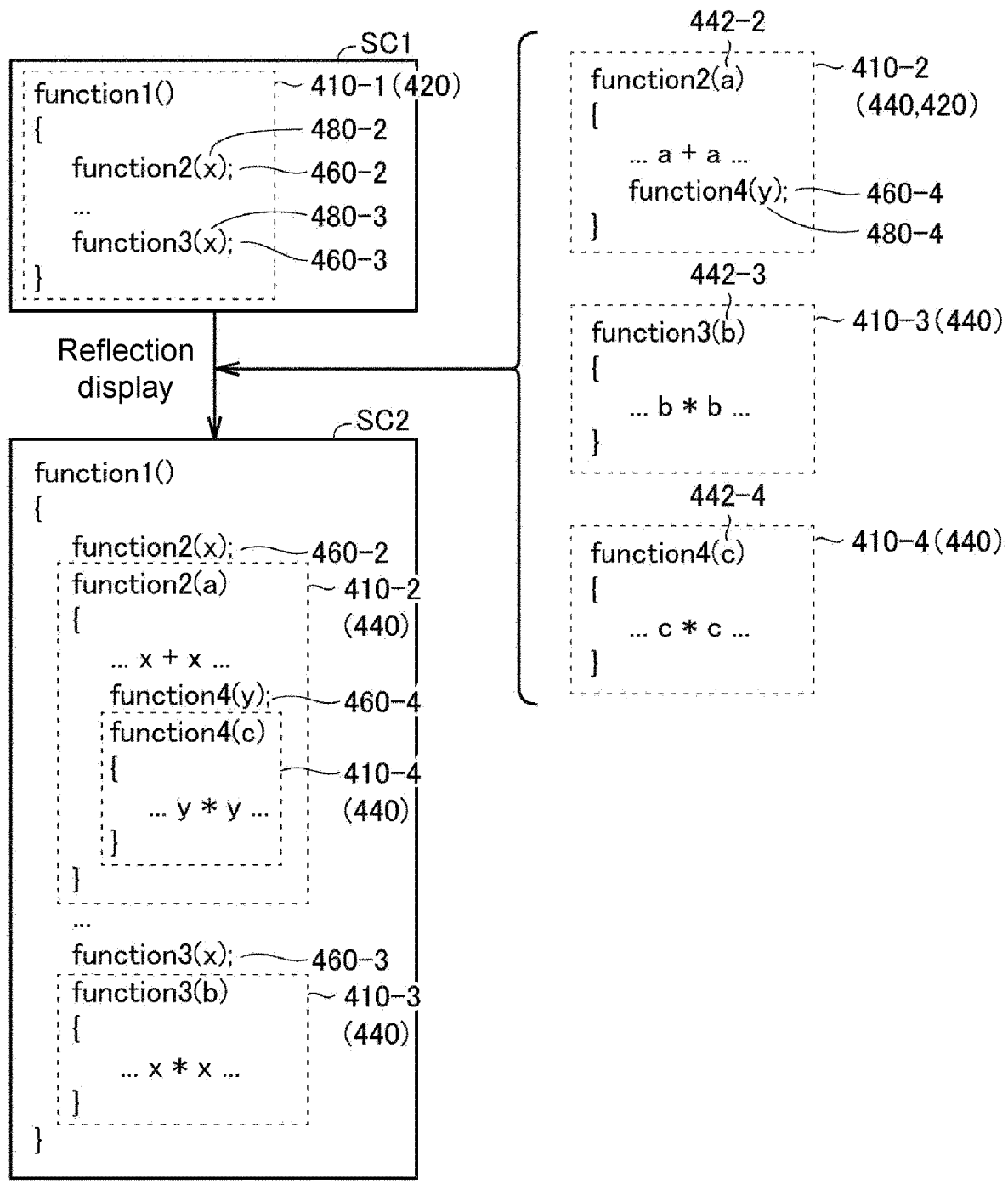
FIG. 9 is a diagram illustrating a first example of reflection display.
Figure 10:
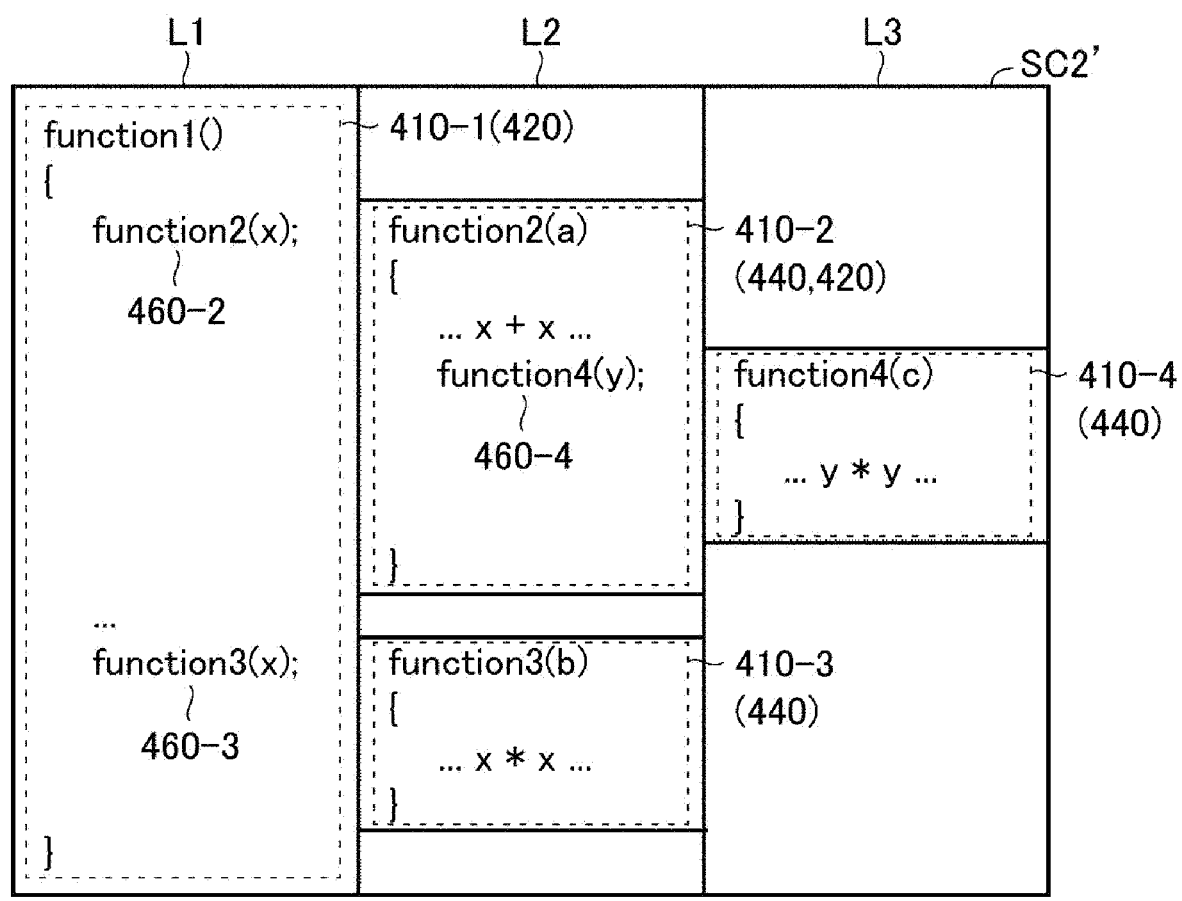
FIG. 10 is a diagram illustrating another display example of the first example of the reflection display.
Figure 11:
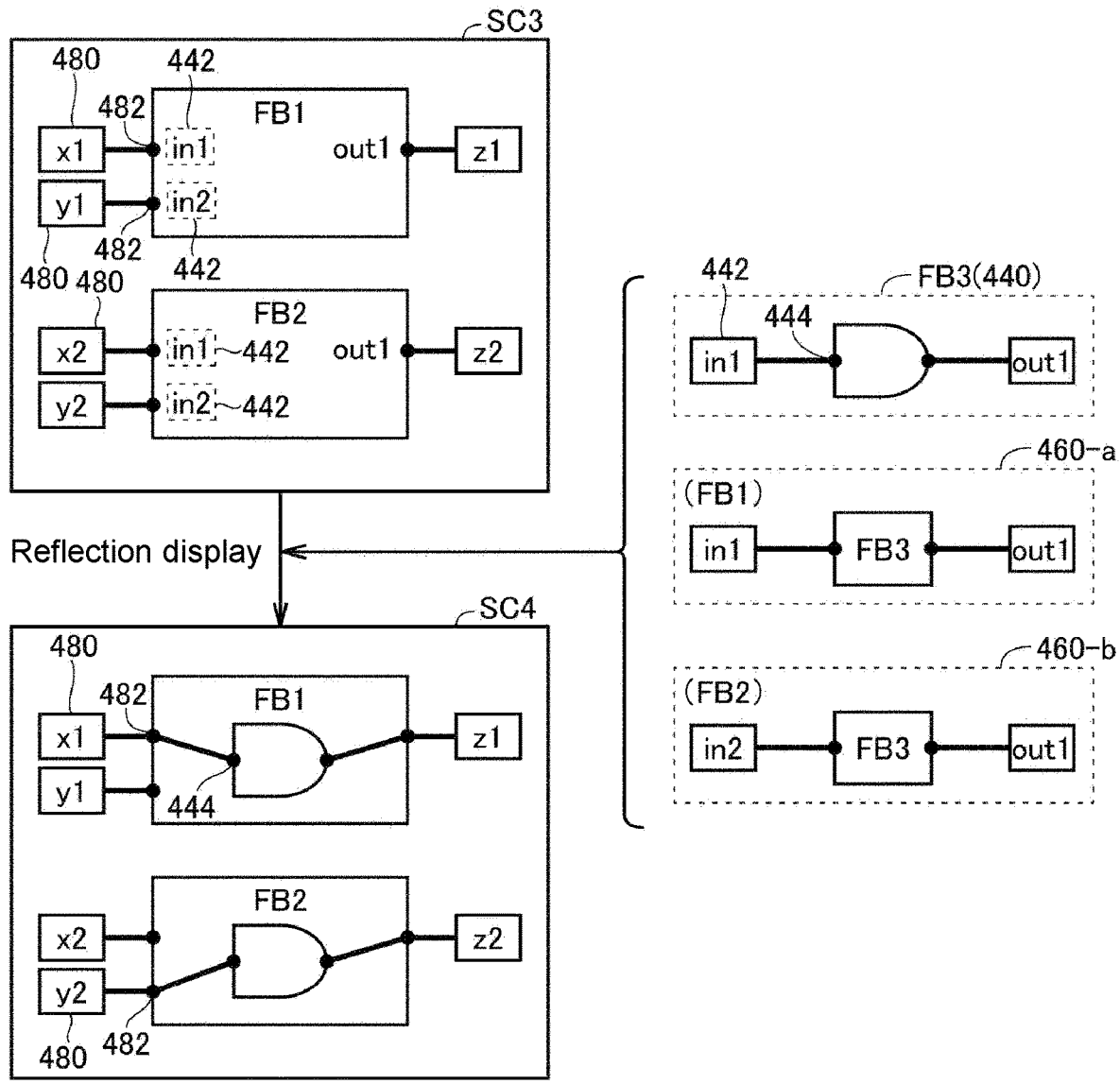
FIG. 11 is a diagram illustrating a second example of the reflection display.

A reflection display of the actual argument 480 will be described with reference to FIGS. 9 to 11. FIG. 9 is a diagram illustrating a first example of the reflection display. FIG. 10 is a diagram illustrating another display example of the first example of the reflection display. FIG. 11 is a diagram illustrating a second example of the reflection display. The reflection display means that the actual argument 480 designated in the call instruction 460 is reflected in the dummy argument 442 in the subprogram 440 and displayed.

(h1. First Example of Reflection Display)

Referring to 9, a screen SC1 shows a program before reflection display, and a screen SC2 shows a program after reflection display.

A program 410-1 illustrated in FIG. 9 is defined by using a procedural programming language including a plurality of instructions, and includes a call instruction 460-2 for calling a program 410-2 and a call instruction 460-3 for calling a program 410-3.

The call instruction 460-2 designates "x" as an actual argument 480-2 to call the program 410-2. The call instruction 460-3 designates "x" as an actual argument 480-3 to call the program 410-3.

The program 410-2 is defined by using "a" as a dummy argument 442-2, and includes a source code "a+a". Further, the program 410-2 includes a call instruction 460-4 for designating "y" as an actual argument 480-4 to call a program 410-4. The program 410-3 is defined by using "b" as a dummy argument 442-3, and includes a source code "b*b". The program 410-4 is defined by using "c" as a dummy argument 442-4, and includes a source code of "c*c".

That is, the program 410-1 corresponds to the main program 420 and the program 410-2 corresponds to the subprogram 440 between the programs 410-1 and 410-2. The program 410-1 corresponds to the main program 420 and the program 410-3 corresponds to the subprogram 440 between the program 410-1 and the program 410-3. The program 410-2 corresponds to the main program 420 and the program 410-4 corresponds to the subprogram 440 between the program 410-2 and the program 410-4.

When content of the program 410-2 and the program 410-3 to be called by the call instruction 460-2 and the call instruction 460-3 included in the program 410-1 are displayed for the call instruction 460-2 and the call instruction 460-3, content of the subprogram 440 is displayed in association with the call instruction 460 in the main program 420 in an aspect in which the actual argument 480 designated in the call instruction 460 is reflected in the dummy argument 442 in the subprogram 440. In an example illustrated in FIG. 9, when the content of the program 410-2 is displayed, content of the program 410-4 called by the call instruction 460-4 included in the program 410-2 is also displayed.

Specifically, the dummy argument 442 in the subprogram 440 is replaced with the actual argument 480 designated in the call instruction 460, and the subprogram 440 is displayed. Referring to FIG. 9, "a+a" in the program 410-2 is converted into "x+x" and displayed. "b*b" in the program 410-3 is converted to "x*x" and displayed. Further, "c*c" in the program 410-4 is converted into "y*y" and displayed.

Thus, the dummy argument 442 in the subprogram 440 is replaced with the actual argument 480 designated in the call instruction 460, making it possible for the user to perform analysis of the user program including the main program 420 without being aware of the dummy argument 442.

Further, the content of the program 410-2, the program 410-3, and the program 410-4 are displayed immediately after the call instruction 460 and displayed as a part of a program including the call instruction 460. For example, the program 410-2 is displayed immediately after the call instruction 460-2 and displayed as part of the program 410-1. The program 410-3 is displayed immediately after the call instruction 460-3 and displayed as a part of the program 410-1. The program 410-4 is displayed immediately after the call instruction 460-4 and displayed as part of the program 410-2. In the example illustrated in FIG. 9, since the program 410-2 is displayed as a part of the program 410-1, the program 410-4 is displayed as a part of the program 410-1.

Thus, it is possible to display a flow of a program in an easy-to-understand manner by displaying the content of the subprogram 440 immediately after the call instruction 460 as a part of the program including the call instruction 460, and as a result, analysis of the user program including the main program 420 is facilitated.

A position in which the content of the subprogram 440 is displayed is not limited to immediately after the call instruction 460 as illustrated in FIG. 9. A modification example of the position in which the subprogram 440 is displayed will be described with reference to FIG. 10. A screen SC2' of FIG. 10 shows a program after the screen SC1 of FIG. 9 is reflected and displayed.

Referring to 10, the position in which the content of the subprogram 440 is displayed may be displayed in a line different from a line in which the program having the call instruction 460 is displayed, in line with the call instruction 460. Specifically, the content of the program 410-1 is displayed in a first line L1, and the content of the program 410-2 is displayed in a second line L2 in line with the call instruction 460-2. Similarly, the content of the program 410-3 is displayed in the second line L2 in line with the call instruction 460-3. Further, the content of the program 410-4 is displayed in line with in the call instruction 460-4 in the program 410-2 in a third line L3.

Thus, it is possible to represent a hierarchical structure of call in an easy-to-understand manner by arranging the content of the subprogram 440 in line with the call instruction 460 and displaying the content in the line different from the line in which the program having the call instruction 460 is displayed. As a result, analysis of the user program including the main program 420 is facilitated.

A timing at which the content of each of the programs 410-2, 410-3, and 410-4 is displayed may be a timing at which one operation is executed. Further, the program called by the call instruction 460 may be displayed only for the selected call instruction 460. For example, when a predetermined operation is received in a situation in which the call instruction 460-2 has been selected, only the content of the program 410-2 may be displayed and the content of the programs 410-3 and 410-4 may not be displayed.

Further, only a program called by a call instruction of a currently displayed program by one operation may be displayed. For example, when one operation is received in a situation shown on the screen SC1, the content of the program 410-2 and the content of the program 410-3 may be displayed, but the content of the program 410-4 may not be displayed.

Further, all programs called by the call instruction 460 may be displayed by one operation, as illustrated in FIGS. 9 and 10.

(h2. Second Example of Reflection Display)

In the first example of the reflection display, a display example in a case in which the user program 400 is defined by using a procedural programming language including a plurality of instructions is shown. The user program 400 may be described, for example, by using a functional block diagram defined using a block representation in which one program constituting the user program 400 represents one functional block or one function.

The second example of the reflection display illustrated in FIG. 11 is a display example in a case in which one or a plurality of programs constituting the user program 400 are defined by a block representation (functional block FB). Each functional block FB is one program module and can be regarded as one program. A screen SC3 in FIG. 11 shows a functional block (program) before reflection display, and a screen SC4 shows a functional block (program) after reflection display.

When the functional block FB is defined, another functional block FB may be called and executed. In an example illustrated in FIG. 11, a functional block FB1 includes a call instruction 460-*a* for calling a functional block FB3. The functional block FB1 is defined by two dummy arguments 442 (an input variable "in1" and an input variable "in2"), and the actual argument 480 of "x1" is designated for the dummy argument 442 as the input variable "in1", and the actual argument 480 as "x2" is designated for the dummy argument 442 of the input variable "in2".

Further, in the call instruction 460-*a*, the input variable "in1" of the functional block FB1 is associated with the dummy argument 442 called an input variable "in1" of the functional block FB3.

Since the actual argument 480 of "x1" is designated for the input variable "in1" of the functional block FB1, it can be said that the functional block FB1 has the call instruction 460-*a* for designating "x1" as the actual argument 480 and calling the functional block FB3 in the example illustrated in FIG. 11.

Similarly, it can be said that a functional block FB2 includes a call instruction 460-*b* for designating "y2" as the actual argument 480 to call the functional block FB3.

The functional block FB usually has an advantage that program design can proceed without being aware of details of a program for defining the functional block FB. However, in a case in which a program is analyzed, the analysis becomes difficult when the inside of the functional block FB remains as a black box.

In the present embodiment, the support device 200 displays the functional block FB called by the call instruction 460 included in the functional block FB as a black box in association with the functional block FB according to the user operation. This makes it possible to show a part of content of the functional block as a black box, which facilitates analysis.

Specifically, a functional block that is a call destination is incorporated inside a functional block that is a call source and displayed. In the example illustrated in FIG. 11, the functional block FB3 is incorporated inside the functional block FB1 and displayed, as shown on the screen SC4. Further, the functional block FB3 is incorporated inside the functional block FB2 and displayed.

As illustrated in FIG. 11, when the functional block FB called by the call instruction 460 is displayed, the called functional block FB (the functional block FB3) may remain as a black box. This makes it possible to utilize the advantage of the functional block FB that the program design can proceed without being aware of details of the program while clarifying a structure of the functional block FB including the call instruction 460.

Further, when the functional block that is a call destination is incorporated inside the functional block that is a call source and displayed, the designated actual argument 480 is reflected in the dummy argument 442 of the functional block that is a call source. Specifically, the functional block that is a call destination is displayed in an aspect that a terminal 482 corresponding to the actual argument 480 of the functional block that is a calling source, and a terminal 444 corresponding to the dummy argument 442 of the functional block that is a call destination are coupled.

In the example illustrated in FIG. 11, the terminal 482 corresponding to the actual argument 480 of "x1" of the functional block FB1 and the terminal 444 corresponding to the dummy argument 442 of "in1" of the functional block FB3 are displayed in a coupled manner, as shown on the screen SC4. Further, the terminal 482 corresponding to the actual argument 480 of "y2" of the functional block FB2 and the terminal 444 corresponding to the dummy argument 442 of "in1" of the functional block FB3 are displayed in a coupled aspect.

Thus, the terminal corresponding to the designated actual argument and the terminal 444 corresponding to the dummy argument 442 are displayed in a coupled manner as a reflection of the actual argument designated in the call instruction, thereby making it easy to visually understand the actual argument input to the called functional block FB3 and facilitating analyze of the functional block.

<I. Other Display Examples>

A method of displaying a program including a specific instruction will be described with reference to FIGS. 12 to 16. The method of displaying each program illustrated in FIGS. 12 to 16 can be arbitrarily combined with the reflection display illustrated in FIGS. 9 to 11.

(i1. Display Example of User Program Including Recursive Call)

When the support device 200 displays the user program 400 including the recursive call, the support device 200 may display content of the recursively called subprogram a predetermined number of times. That is, the support device 200 may not display content of a subprogram more than a predetermined number of times when the subprogram is called recursively.

Figure 12:
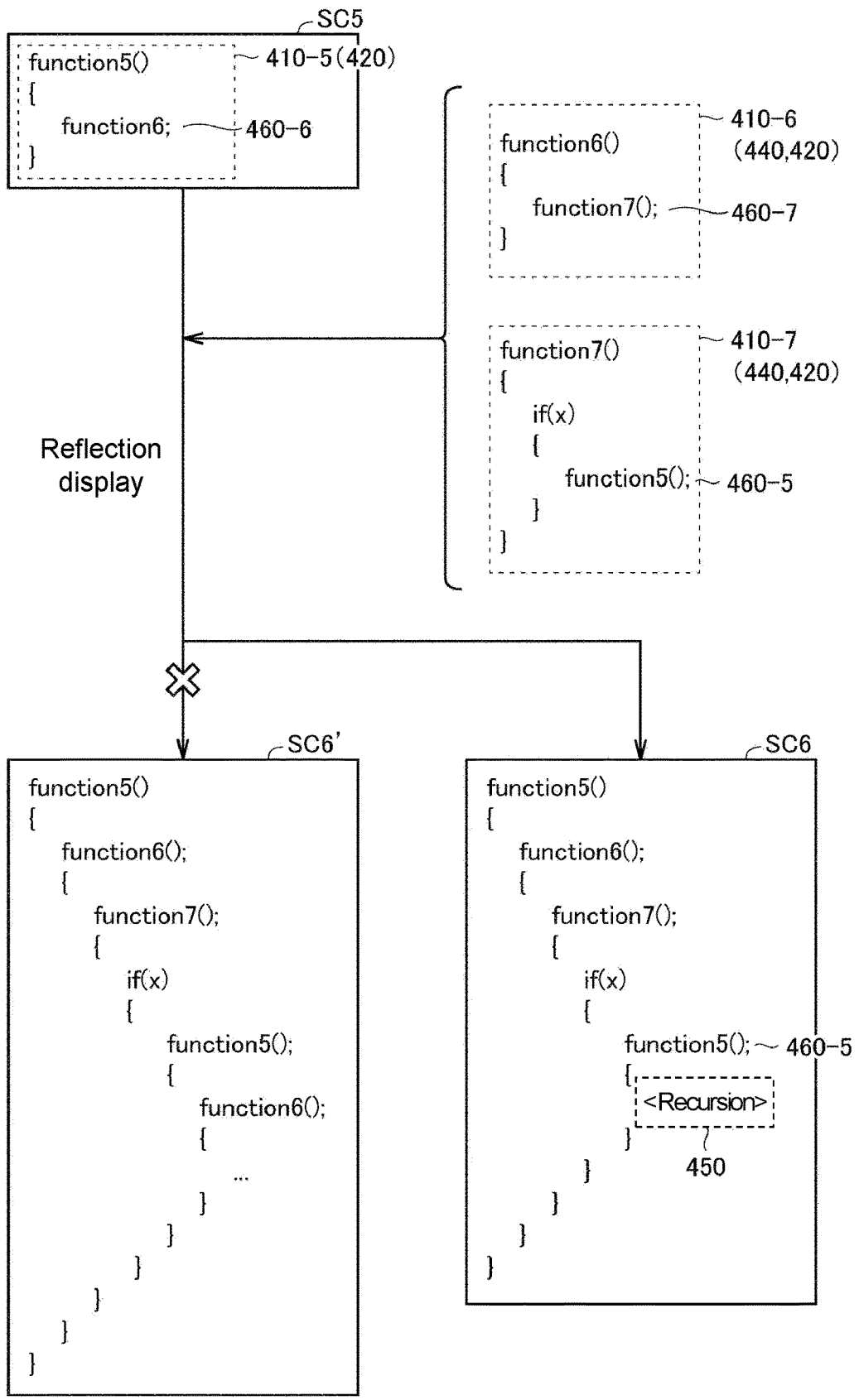
FIG. 12 is a diagram illustrating a display example of a user program including a recursive call.

FIG. 12 is a diagram illustrating a display example of a user program including a recursive call. In FIG. 12, a display of the dummy argument 442 and the actual argument 480 is omitted. A program 410-5 illustrated in FIG. 12 includes a call instruction 460-6 for calling a program 410-6. The program 410-6 has a call instruction 460-7 for calling a program 410-7. The program 410-7 has a call instruction 460-5 for calling the program 410-5. The call instruction 460-5 is a recursive call.

That is, the program 410-5 is a program including an instruction for recursively calling the program 410-6 and the program 410-7. In this case, in a case in which a restriction that "displaying content of the recursively called subprogram a predetermined number of times" is not set when the content of the subprogram 440 called by the call instruction 460 is to be displayed, content of a subprogram (the programs 410-6 and 410-7) called recursively is repeatedly displayed, as in a display example shown on a screen SC6' in FIG. 12. As a result, it becomes difficult for the user to ascertain the content of the program 410-5.

By setting the restriction that "content of the recursively called subprogram a predetermined number of times", it is possible to prevent the content of the subprogram from being repeatedly displayed as in a display example shown on a screen SC6 in FIG. 12, and as a result, to display the content of the program 410-5 in an easy-to-ascertain aspect. In the example illustrated in FIG. 12, one is set as the predetermined number of times. The number of times the content of the subprogram is displayed may be determined in advance and is not limited to one. For example, the number of times may be twice or more. In order to show the content of the subprogram and make it easier to ascertain the content of the program, it is preferable for the number of times the content of the subprogram is displayed to be one.

Further, referring to the screen SC6 in FIG. 12, the support device 200 may display a text image 450 that is "recursive" indicating recursive calling immediately after the call instruction 460-5. It is easy to understand that the call instruction 460-5 is a recursively calling instruction by the text image 450, which is "recursive" indicating recursive calling, being displayed immediately after the call instruction 460-5. An image showing recursive calling is not limited to the text image 450 illustrated in FIG. 12.

(i2. Example in which Content of Predetermined Subprogram is not Displayed)

The support device 200 may not display content of a program designated in advance. The support device 200 may not display the content of the program registered as the display omission list 470.

The display omission list 470 is stored in, for example, the storage unit 201 of the support device 200. The display omission list 470 may be created by the user or may be created by a vendor that provides the support program in advance. Further, the user may add a program to the display omission list 470 created by the vendor in advance.

Figure 13:
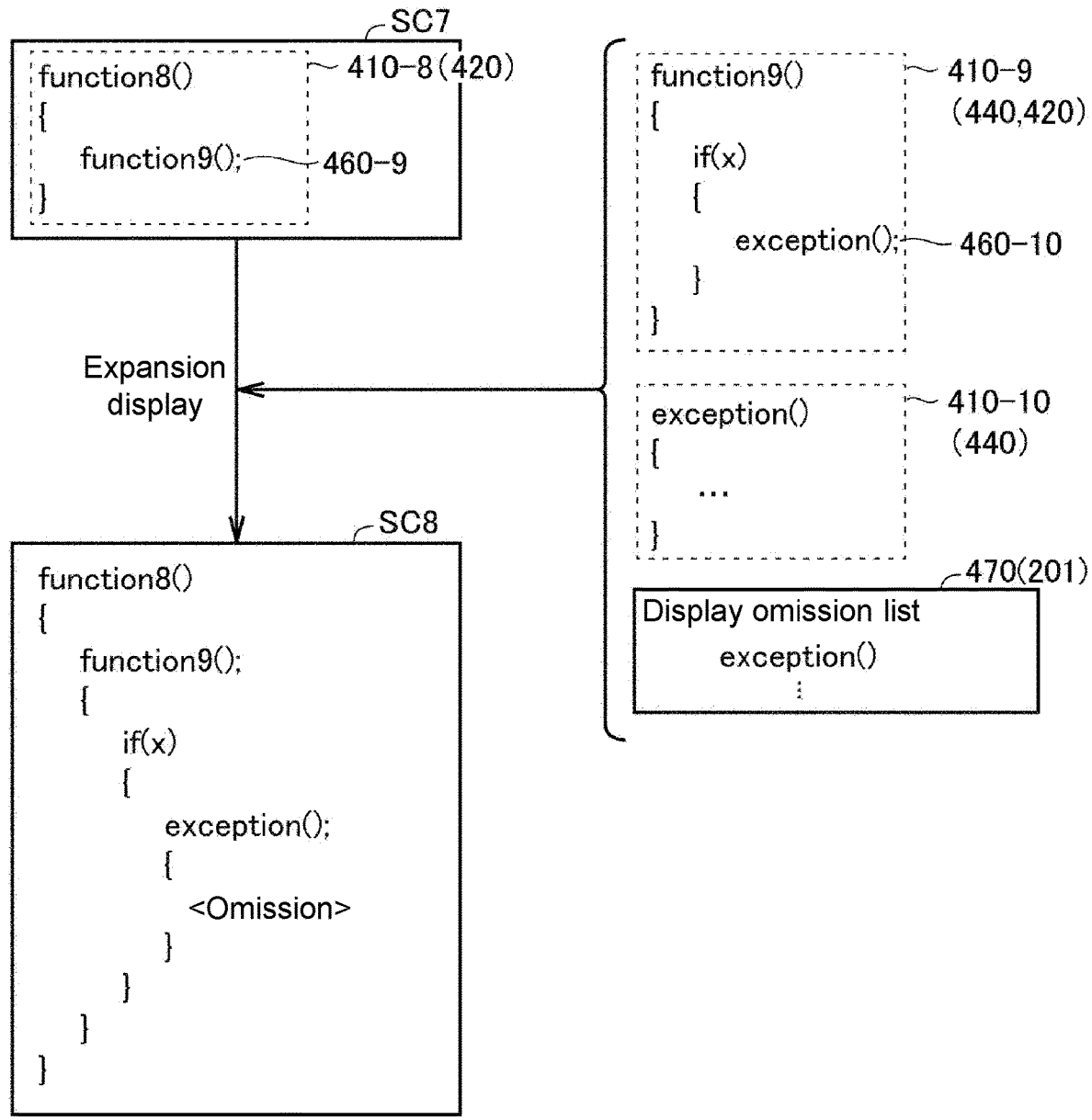
FIG. 13 is a diagram illustrating a display example of a user program including a program registered in a display omission list 470.

FIG. 13 is a diagram illustrating a display example of a user program including a program registered in the display omission list 470. In FIG. 13, a display of the dummy argument 442 and the actual argument 480 is omitted.

A program 410-8 illustrated in FIG. 13 includes a call instruction 460-9 for calling a program 410-9. The program 410-9 includes a call instruction 460-10 for calling a program 410-10. The program 410-10 is registered in the display omission list 470.

As illustrated in a display example shown on a screen SC8 in FIG. 13, when the support device 200 shows the program 410-8 in an aspect in which the content of the subprogram 440 called by the included call instruction 460 has been reflected, the support device 200 omits the program 410-10 registered in the display omission list 470 without content thereof being displayed.

For the program 410-8, when content of all the subprograms 440 called by the included call instruction 460 are displayed, the number of lines becomes enormous or the structure becomes complicated, which may make analysis difficult.

As illustrated in FIG. 13, it is possible to display only content of a necessary program by omitting content of the program registered in the display omission list 470, and the analysis is facilitated.

(i3. Display Example of Branch Program)

The support device 200 may have a function of switching from an aspect in which respective different processes are displayed in series to an aspect in which the respective different processes are displayed in parallel according to a user operation when content of the branch program for executing the different processes according to satisfaction conditions is displayed for the branch program.

Figure 14:
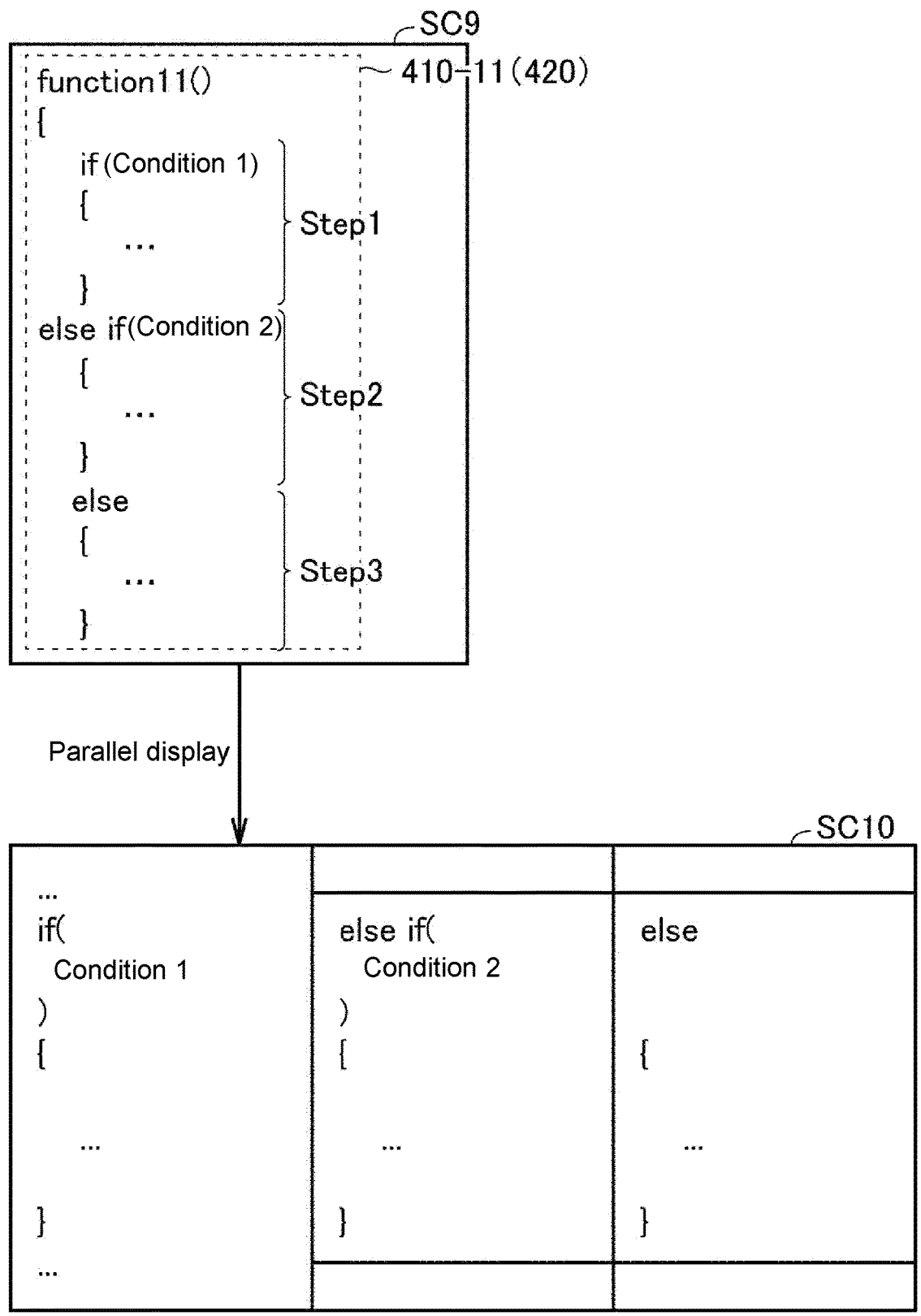
FIG. 14 is a diagram illustrating a display example of a branch program.

FIG. 14 is a diagram illustrating a display example of the branch program. A screen SC9 in FIG. 14 is a display example in which different processes are displayed in series. A screen SC10 in FIG. 14 is a display example in which different processes are displayed in parallel. In FIG. 14, a display of the dummy argument 442 and the actual argument 480 is omitted.

A program 410-11 illustrated in FIG. 14 includes a process called Step 1, a process called Step 2, and a process called Step 3. Different execution conditions are defined for respective processes of Step 1 to Step 3. Specifically, Step 1 is a process that is executed when condition 1 is satisfied. Step 2 is a process that is executed when condition 1 is not satisfied and condition 2 is satisfied. Step 3 is a process that is executed when neither condition 1 nor condition 2 is satisfied.

The support device 200 displays the screen SC10 when a predetermined operation by the user is received in a state in which the screen SC9 is displayed. The screen SC10 may be displayed while being superimposed on the screen SC9, or switching from the screen SC9 to the screen SC10 may occur.

Referring to the screen SC9, in the program 410-11, a plurality of processes Step1 to Step3 having different satisfaction conditions are displayed in series. Referring to the screen SC10, in the program 410-11, a plurality of processes Step1 to Step3 having different satisfaction conditions is displayed in parallel.

Thus, when a program having a logical configuration in which satisfaction conditions differ from each other and a process branches is displayed, displaying Step1 to Step3 in parallel makes it easy to understand how the process branches and facilitates the analysis of the program.

In an example illustrated in FIG. 14, a program including an if statement has been shown, but the present invention is not limited to the program including an if statement as long as the program is a program in which a branch occurs. Examples of the program in which a branch occurs include a program including "switch~case", and a program including "try~catch".

(i4. Display Example of Program in which Actual Argument is Replaced with Address)

The support device 200 replaces a variable designated as the actual argument 480 with a port number (address) of a functional units (for example, the I/O units 14 and 16) corresponding to the variable on the basis of the global variable table 150, and performs the display.

Figure 15:
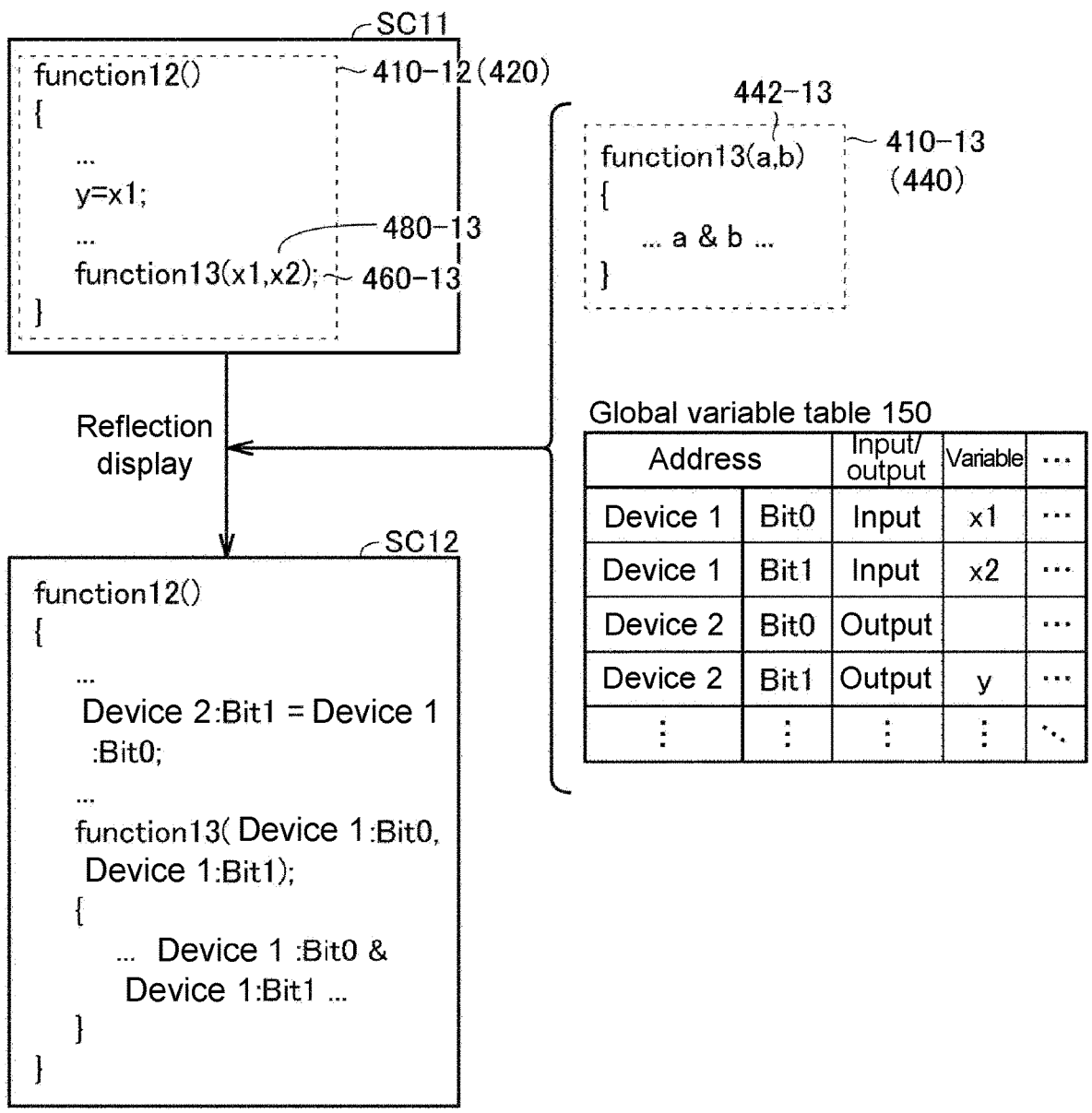
FIG. 15 is a diagram illustrating a display example of a program in which an actual argument is replaced with an address.

FIG. 15 is a diagram illustrating a display example of a program in which actual arguments are replaced with addresses. A screen SC11 shows a program before the actual argument is replaced with the address, and a screen SC12 shows a program after the actual argument is replaced with the address.

A program 410-12 illustrated in FIG. 15 includes a source code "y=x1;" defined by the actual argument 480 and a call instruction 460-13 for calling a program 410-13. The call instruction 460-13 designates "x1" and "x2" as actual arguments to call the program 410-13.

The program 410-13 is defined by using "a" and "b" as the dummy arguments 442, and includes a source code "a & b".

In the global variable table 150, an address Bit0 of device 1 and a variable "x1" are associated with each other, an address Bit1 of device 1 and a variable "x2" are associated with each other, and an address Bit1 of device 2 and a variable "y" are associated with each other.

For the call instruction 460-13 included in the program 410-12, when content of the program 410-13 to be called is displayed,
is replaced with the designated actual argument 480, further replaced with an address corresponding to the actual argument 480, and displayed.

Specifically, referring to FIG. 15, "a & b" in the program 410-13 is replaced with "device 1: Bit0 & device 1: Bit1" via "x1 & x2" and the display is performed. Further, "y=x1;" in the program 410-12 is replaced with "device 2: Bit1=device 0: Bit0;".

Thus, the actual argument 480 is replaced with an address of an actual device (for example, the I/O units 14 and 16) and displayed, so that an address with which each actual argument 480 is associated can be displayed in an easy-to-understand manner. For example, in the PLC 100, it is possible to use a program in which an address is directly designated as the actual argument 480, but when the address is designated, reusability of a program created by designating the address is lost and thus, variable programming is often used. However, in a case in which a program is analyzed, it is easier to analyze the program when an address corresponding to input and output values that are the respective variables is specified. The actual argument 480 is replaced with an address and performing a display as illustrated in FIG. 15, making it possible to ascertain a device of which input and output values are used by the program as an analysis target at a glance and facilitating the analysis of the program.

(i5. Display Example of Program that Exchanges Data with Other Programs)

The PLC 100 can exchange data with other devices such as another PLC 100 and the HMI 300 via the external network controller 126. Further, the PLC 100 can perform sending and reception of data between different programs associated with different tasks.

That is, the user can create a program for performing sending and reception of data between separately executed programs. The respective separately executed programs may be programs that are executed by one PLC 100, or may be programs that are executed by different devices.

The support device 200 may display a program configured to send and receive data to and from the separately executed program in association with a program that is a data sending and reception destination.

Figure 16:
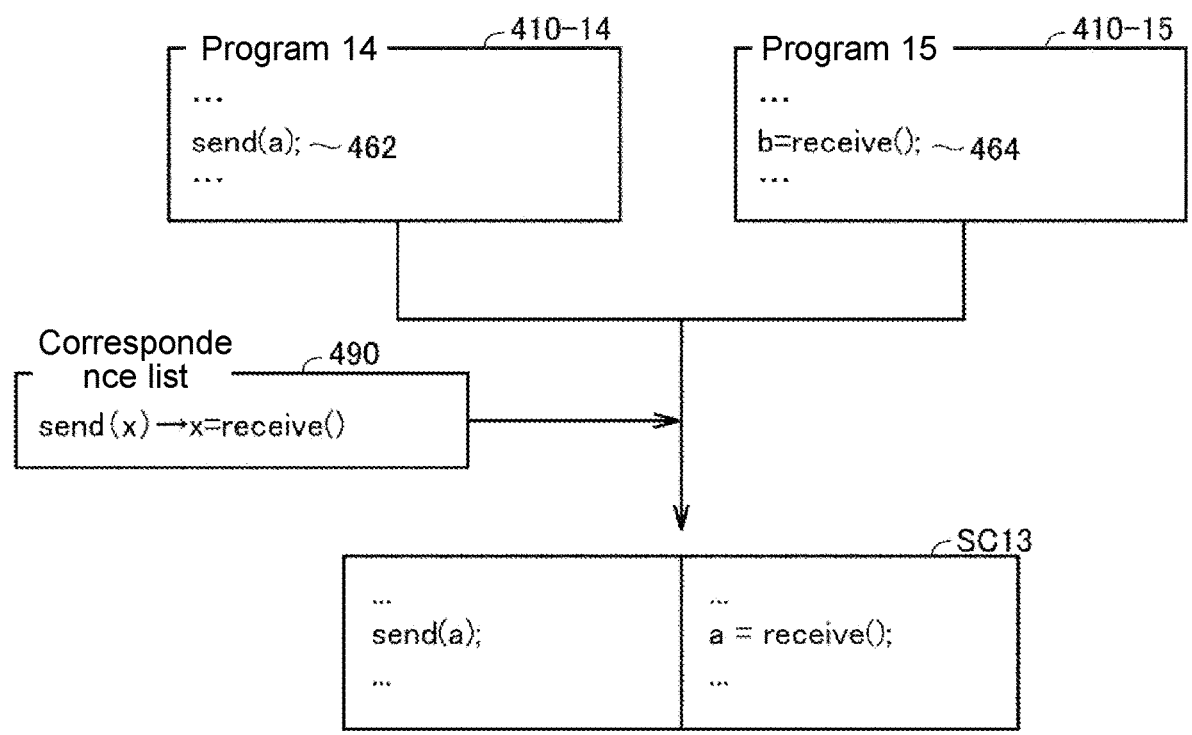
FIG. 16 is a diagram illustrating a display example of a program configured to send and receive data to and from a separately executed program.

FIG. 16 is a diagram illustrating a display example of a program configured to send and receive data to and from the separately executed program. For example, a program 410-14 and a program 410-15 are executed separately from each other. Further, the program 410-14 includes a sending instruction 462 for sending data to the program 410-15. The program 410-15 includes a reception instruction 464 for receiving data from the program 410-14.

The support device 200 stores the correspondence list 490 that associates the sending instruction 462 with the reception instruction 464 in the storage unit 201.

When the support device 200 displays the program 410-14, the support device 200 can display the program 410-14 and the program 410-15 in association with each other on the basis of the correspondence list 490.

Specifically, the reception instruction 464 is displayed in association with the sending instruction 462, and a variable received by the reception instruction 464 is reflected in the reception instruction 464 and displayed, as shown on a screen SC13. In this case, content of the program 410-15 including the reception instruction 464 is shown in a line different from a line in which content of the program 410-14 including the sending instruction 462 is shown.

Thus, for the program configured to perform sending and reception of data between the separately executed programs, a program including an instruction to send data and a program including an instruction to receive data are displayed in association with each other, making it possible to show a correspondence relationship between the programs even when the programs differ from each other and facilitating the analysis of the program.

<J. Display by HMI 300>

In the above embodiment, an example in which the display of the program illustrated in FIGS. 9 to 16 is displayed on the display 214 of the support device 200 is illustrated. The CPU 302 of the HMI 300 can execute displays illustrated in FIGS. 9 to 12 and 14 by executing the display program 375 while referring to the user program 500 and the call instruction list 273.

When the HMI 300 can refer to the global variable table 150, the display illustrated in FIG. 15 on the display 314 may be performed. Further, when the HMI 300 can refer to the display omission list 470, the display illustrated in FIG. 13 on the display 314 may be performed. Further, when the HMI 300 can refer to the correspondence list 490, the display illustrated in FIG. 16 on the display 314 may be performed.

In the present embodiment, since the HMI 300 includes the call instruction list 273, it is possible to easily specify the subprogram 440 to be called, when the content of the subprogram 440 is displayed. As a result, since a process of interpreting the content of the call instruction 460 and then searching for a storage location of the subprogram 440 called by the call instruction 460 is not necessary, it is possible to simplify a process of displaying the content of the subprogram 440. Further, since the call instruction list 273 may be followed when the actual argument is reflected in the dummy argument, a process of interpreting the content of the call instruction 460 and then specifying the actual argument corresponding to the dummy argument is not necessary, thereby simplifying the process.

Although the example in which the HMI 300 displays the program by using the user program 500 and the call instruction list 273 has been shown, the program may be displayed by using the user program 400, as in the support device 200.

§ 3. Supplements

As described above, the above embodiment includes the following disclosure.

<Configuration 1>

An information processing device (200X, 200, or 300) for supporting development of a user program (400) executed by a control device for controlling a control target, the information processing device including:
  a reception means (221X, 221, or 321) configured to receive a user operation;
  a holding means (201X, 201, 301) configured to hold a user program created or updated by a user; and
  a display means (226X, 226, or 326) configured to display the user program held in the holding means,
  wherein the user program includes
  a first program (440) defined by using a dummy argument (442), and
  a second program (420) including a call instruction (460) for designating an actual argument (480) and calling the first program, and
    when the display means displays content of the first program in association with the call instruction in the second program according to a user operation, the display means reflects the actual argument designated in the call instruction in the dummy argument in the first program to display the content (SC2, SC2', or SC4).

<Configuration 2>

The information processing device according to configuration 1,
  wherein the user program is defined by using a procedural programming language including one or a plurality of instructions, and
  the display means replaces the dummy argument in the first program with an actual argument designated in the call instruction as a reflection of the actual argument designated in the call instruction (SC2 or SC2').

<Configuration 3>

The information processing device according to configuration 2,
  wherein the display means displays the content of the first program as a part of the second program immediately after the call instruction in the second program (SC2).

<Configuration 4>

The information processing device according to configuration 2,
  wherein the display means displays the content of the first program in a line different from a line in which the second program is displayed, in line with the call instruction in the second program (SC2').

<Configuration 5>

The information processing device according to any one of configurations 1 to 4,
  wherein the first program includes a call instruction (460-5) for recursively calling the first program, and
  when the display means displays the content of the first program in association with the call instruction in the second program, the display means displays the content of the first program called by the call instruction in the first program a predetermined number of times (SC6).

<Configuration 6>

The information processing device according to any one of configurations 1 to 5,
  wherein the first program includes one or a plurality of types of call instructions, and
  the display means does not set a predetermined specific instruction (410-10) among the one or plurality of types of call instructions as a target for which content of a program called by the call instruction is displayed in association with the call instruction (SC8).

<Configuration 7>

The information processing device according to configuration 1,
  wherein the first program and the second program are defined using a block representation including at least one input variable and at least one output variable indicating a functional block or a function, and
  the display means incorporates a first block representation (FB3) indicating the first program into a second block representation (FB1 or FB2) indicating the call instruction included in the second program as a reflection of the actual argument designated in the call instruction (460-*a*), and performs the display in an aspect in which a terminal (482) corresponding to the actual argument of the second block representation and a terminal (444) corresponding to the dummy argument of the first block representation are coupled (SC4).

<Configuration 8>

The information processing device according to any one of configurations 1 to 7,
wherein the user program includes a branch program (410-11) for executing different processes depending on a satisfaction condition, and
the display means displays content of the different processes in parallel according to a user operation for the branch program (SC10).

<Configuration 9>

The information processing device according to any one of configurations 1 to 8,
wherein the control device includes one or a plurality of input ports, and
the display means replaces the actual argument with an address of each of the one or a plurality of input ports and performs the display for the user program on the basis of a variable map (150) in which the actual argument is associated with the address (SC12).

<Configuration 10>

The information processing device according to any one of configurations 1 to 9,
wherein the user program includes a third program (410-15) for executing data exchange with another program (410-14), and
the display means displays the third program in association with the other program (SC13).

<Configuration 11>

A support program (275 or 375) for supporting development of a user program (400) executed by a control device for controlling a control target,
wherein the user program includes
a first program (440) defined by using a dummy argument (442), and
a second program (420) including a call instruction (460) for designating an actual argument (480) and calling the first program, and
the support program causes a computer to execute
a step (201 or 301) of holding a user program created or updated by a user, and
a step (221 or 321) of receiving a user operation,
a step (226, 326, SC2, SC2', or SC4) of displaying content of the first program in association with the call instruction in the second program for the held user program according to a received operation, and reflecting the actual argument designated in the call instruction in the dummy argument in the first program to display the content.

<Configuration 12>

A support system (1) including an information processing device (200) for supporting development of a user program (400) executed by a control device for controlling a control target, and a display device (300),
wherein the support system includes
a reception means (221 or 321) configured to receive a user operation;
a holding means (201 or 301) configured to hold a user program created or updated by a user; and
a display means (226 or 326) configured to display the user program held in the holding means,
wherein the user program includes
a first program (440) defined by using a dummy argument (442), and
a second program (420) including a call instruction (460) for designating an actual argument (480) and calling the first program, and when the display means displays content of the first program in association with the call instruction in the second program according to a user operation, the display means reflects the actual argument designated in the call instruction in the dummy argument in the first program to display the content (SC2, SC2', or SC4).

It should be considered that the embodiment disclosed this time is illustrative in all respects and is not restrictive. The scope of the disclosure is not shown by the above description, but is shown by claims, and is intended to include all modifications within meaning and scope equivalent to the claims. Further, the inventions described in the embodiments and the modification examples thereof are intended to be implemented alone or in combination as much as possible.

What is claimed is:

1. An information processing device for supporting development of a user program executed by a control device for controlling a control target, the information processing device comprising:
    a processor, configured to:
        receive a user operation;
        hold a user program created or updated by a user; and
        display the user program on a screen,
    wherein the user program includes
    a first program defined by using a dummy argument, and
    a second program including a call instruction for designating an actual argument and calling the first program, and
    when the processor displays content of the first program in association with the call instruction in the second program on the screen according to a user operation with respect to the call instruction, the processor reflects the actual argument designated in the call instruction in the second program to the dummy argument in the display content of the first program on the screen, wherein the user program is defined by using a procedural programming language including one or a plurality of instructions, and
    the processor replaces the dummy argument in the first program with the actual argument designated in the call instruction as a reflection of the actual argument designated in the call instruction to the dummy argument in the display content of the first program on the screen.

2. The information processing device according to claim 1, wherein the processor displays the content of the first program as a part of the second program immediately after the call instruction in the second program.

3. The information processing device according to claim 1, wherein the processor displays the content of the first program in a line different from a line in which the second program is displayed, in line with the call instruction in the second program.

4. The information processing device according to claim 1,
    wherein the first program includes a call instruction for recursively calling the first program, and
    when the processor displays the content of the first program in association with the call instruction in the second program, the processor displays the content of the first program called by the call instruction in the first program a predetermined number of times on the screen.

5. The information processing device according to claim 1, wherein the first program includes one or a plurality of types of call instructions, and the processor does not set a predetermined specific instruction among the one or plurality of types of call instructions as a target for which content of a program called by the call instruction is displayed in association with the call instruction on the screen.

6. The information processing device according to claim 1, wherein the first program and the second program are defined using a block representation including at least one input variable and at least one output variable indicating a functional block or a function, and the processor incorporates a first block representation indicating the first program into a second block representation indicating the call instruction included in the second program as a reflection of the actual argument designated in the call instruction, and performs the display in an aspect in which a terminal corresponding to the actual argument of the second block representation and a terminal corresponding to the dummy argument of the first block representation are coupled.

7. The information processing device according to claim 1, wherein the user program includes a branch program for executing different processes depending on a satisfaction condition, and the processor displays content of the different processes in parallel according to a user operation for the branch program.

8. The information processing device according to claim 1, wherein the control device includes one or a plurality of input ports, and the processor replaces the actual argument with an address of each of the one or plurality of input ports and performs the display for the user program on the basis of a variable map in which the actual argument is associated with the address.

9. The information processing device according to claim 1, wherein the user program includes a third program for executing data exchange with another program, and the processor displays the third program in association with the other program.

10. The information processing device according to claim 1, wherein the processor does not display content of the first program not in association with the call instruction in the second program on the screen.

11. A non-transitory recording medium, recording a support program for supporting development of a user program executed by a control device for controlling a control target, wherein the user program includes:

a first program defined by using a dummy argument, and a second program including a call instruction for designating an actual argument and calling the first program, and the support program causes a computer to hold a user program created or updated by a user, receive a user operation, display content of the first program in association with the call instruction in the second program on the screen according to a received operation with respect to the call instruction, and reflecting the actual argument designated in the call instruction in the second program to the dummy argument in the display content of the first program on the screen, wherein the user program is defined by using a procedural programming language including one or a plurality of instructions, and replace the dummy argument in the first program with the actual argument designated in the call instruction as a reflection of the actual argument designated in the call instruction to the dummy argument in the display content of the first program on the screen.

12. A support system comprising an information processing device for supporting development of a user program executed by a control device for controlling a control target, and a display device, wherein the information processing device comprises a processor configured to:

receive a user operation;

hold a user program created or updated by a user; and display the user program on a screen, wherein the user program includes a first program defined by using a dummy argument, and a second program including a call instruction for designating an actual argument and calling the first program, and when the processor displays content of the first program in association with the call instruction in the second program on the screen according to a user operation with respect to the call instruction, the processor reflects the actual argument designated in the call instruction in the second program to the dummy argument in the display content of the first program on the screen, wherein the user program is defined by using a procedural programming language including one or a plurality of instructions, and the processor replaces the dummy argument in the first program with the actual argument designated in the call instruction as a reflection of the actual argument designated in the call instruction to the dummy argument in the display content of the first program on the screen.

* * * * *